US010073643B2

(12) United States Patent
Jung et al.

(10) Patent No.: US 10,073,643 B2
(45) Date of Patent: Sep. 11, 2018

(54) METHOD OF INITIALIZING STORAGE DEVICE INCLUDING ONE OR MORE INTERFACE CHIPS AND NONVOLATILE MEMORY DEVICES CONNECTED TO THE ONE OR MORE INTERFACE CHIPS

(71) Applicants: Bong-Kil Jung, Seoul (KR); Hyunggon Kim, Hwaseong-si (KR)

(72) Inventors: Bong-Kil Jung, Seoul (KR); Hyunggon Kim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 35 days.

(21) Appl. No.: 15/090,806

(22) Filed: Apr. 5, 2016

(65) Prior Publication Data
US 2016/0321002 A1  Nov. 3, 2016

(30) Foreign Application Priority Data

Apr. 30, 2015 (KR) .................. 10-2015-0061342

(51) Int. Cl.
*G06F 12/00* (2006.01)
*G06F 3/06* (2006.01)
*G06F 12/02* (2006.01)
(52) U.S. Cl.
CPC .......... *G06F 3/0632* (2013.01); *G06F 3/0605* (2013.01); *G06F 3/0658* (2013.01); *G06F 3/0679* (2013.01); *G06F 3/0688* (2013.01); *G06F 12/0246* (2013.01); *G06F 2212/2022* (2013.01); *G06F 2212/72* (2013.01)

(58) Field of Classification Search
CPC .... G06F 3/0632; G06F 3/0688; G06F 3/0605; G06F 3/0679; G06F 3/0658
See application file for complete search history.

(56) References Cited

U.S. PATENT DOCUMENTS

| | | | |
|---|---|---|---|
| 5,513,374 A * | 4/1996 | Baji | ................. G06F 13/32 710/26 |
| 7,679,133 B2 | 3/2010 | Son et al. | |
| 7,774,525 B2 | 8/2010 | Farhan et al. | |
| 8,139,430 B2 | 3/2012 | Buchmann et al. | |
| 8,341,332 B2 | 12/2012 | Ma et al. | |
| 8,433,844 B2 | 4/2013 | Lin | |
| 8,447,908 B2 | 5/2013 | Bruce et al. | |
| 8,553,466 B2 | 10/2013 | Han et al. | |
| 8,559,235 B2 | 10/2013 | Yoon et al. | |
| 8,621,148 B2 | 12/2013 | Eilert | |
| 8,654,587 B2 | 2/2014 | Yoon et al. | |
| 8,706,955 B2 | 4/2014 | Fai et al. | |

(Continued)

FOREIGN PATENT DOCUMENTS

WO WO2013048485 A1 4/2013

*Primary Examiner* — Tuan Thai
*Assistant Examiner* — Tasnima Matin
(74) *Attorney, Agent, or Firm* — Volentine, Whitt & Francos, PLLC

(57) ABSTRACT

A method of initializing a storage device includes; resetting an interface chip in response to a reset signal generated by the memory controller, loading a boot loader from a nonvolatile memory device via the interface chip in response to a nonvolatile memory initialization signal generated by the memory controller, and initializing a plurality of nonvolatile memory devices by executing the boot loader in the memory controller.

19 Claims, 26 Drawing Sheets

(56) References Cited

U.S. PATENT DOCUMENTS

| | | |
|---|---|---|
| 8,947,937 B1 | 2/2015 | Asnaashari |
| 2007/0088940 A1 | 4/2007 | M. Conley |
| 2007/0233955 A1* | 10/2007 | Luo .................... G06F 12/1416 |
| | | 711/115 |
| 2007/0253251 A1* | 11/2007 | Mizushima ............ G06K 19/07 |
| | | 365/185.04 |
| 2008/0086631 A1* | 4/2008 | Chow .................... G06F 8/665 |
| | | 713/2 |
| 2008/0114924 A1 | 5/2008 | Frayer et al. |
| 2008/0235443 A1* | 9/2008 | Chow ................ G06F 12/0851 |
| | | 711/103 |
| 2009/0113121 A1* | 4/2009 | Lee .................... G06F 12/0246 |
| | | 711/103 |
| 2009/0172257 A1 | 7/2009 | Prins et al. |
| 2009/0196102 A1* | 8/2009 | Kim .................... G11C 7/1045 |
| | | 365/185.11 |
| 2011/0173376 A1 | 7/2011 | Yuan et al. |
| 2011/0208896 A1* | 8/2011 | Wakrat ................ G06F 12/0246 |
| | | 711/103 |
| 2011/0233648 A1 | 9/2011 | Seol et al. |
| 2013/0166934 A1* | 6/2013 | Chu .................... G06F 1/3275 |
| | | 713/323 |
| 2013/0238837 A1 | 9/2013 | Sawaoka |
| 2014/0006688 A1* | 1/2014 | Yu .......................... G11C 16/10 |
| | | 711/103 |
| 2014/0143481 A1* | 5/2014 | Asnaashari ............ G06F 13/00 |
| | | 711/103 |
| 2014/0185389 A1 | 7/2014 | Jeon et al. |
| 2014/0250348 A1 | 9/2014 | Harari et al. |
| 2014/0359382 A1* | 12/2014 | Choi .................. G06F 11/2094 |
| | | 714/710 |
| 2016/0286347 A1 | 9/2016 | Dhupar et al. |

\* cited by examiner

METHOD OF INITIALIZING STORAGE DEVICE INCLUDING ONE OR MORE INTERFACE CHIPS AND NONVOLATILE MEMORY DEVICES CONNECTED TO THE ONE OR MORE INTERFACE CHIPS

CROSS-REFERENCE TO RELATED APPLICATION

This U.S. non-provisional patent application claims priority under 35 USC § 119 to Korean Patent Application No. 10-2015-0061342 filed on Apr. 30, 2015, the subject matter of which is hereby incorporated by reference.

BACKGROUND

The inventive concept relates generally to semiconductor storage devices and initializing method for same.

Semiconductor memory devices may be classified as volatile and nonvolatile according to their operative nature. Nonvolatile memory devices are able to retain stored data in the absence of applied power. Certain nonvolatile memory devices may be electronically programmed while providing relatively dense (i.e., storage data per unit area of the constituent semiconductor chip) and inexpensive data storage. Given these characteristics nonvolatile memory devices have been widely adopted for use in many contemporary and emerging applications to store program data, micro-code, user payload data, etc. Applications include computers, avionics, telecommunications, and consumer electronics.

SUMMARY

Embodiments of the inventive concept provide a data storage device (hereafter, "storage device") capable of performing an initialization operation, or operating in response to an initializing method.

In one embodiment, the inventive concept provides a method of initializing a storage device in a memory system including a memory controller and the storage device, wherein the storage device includes an interface chip and a plurality of nonvolatile memory devices connected to the interface chip. The method includes; resetting the interface chip in response to a reset signal generated by the memory controller, and then loading a boot loader from at least one of the plurality of nonvolatile memory devices to the memory controller via the interface chip in response to a nonvolatile memory initialization signal generated by the memory controller, and initializing the plurality of nonvolatile memory devices by executing the boot loader in the memory controller.

In another embodiment, the inventive concept provides a method of initializing a multi-layer storage device in a memory system including a memory controller and the storage device, wherein the storage device includes a first interface chip disposed at a first layer, a second interface chip disposed at a second layer and a plurality of nonvolatile memory devices connected to the second interface chip. The method includes; resetting the first and second interface chips in response to a reset signal generated by the memory controller, and then loading a boot loader from a nonvolatile memory device among the plurality of nonvolatile memory devices to the memory controller via the first and second interface chips in response to a nonvolatile memory initialization signal generated by the memory controller, and initializing the plurality of nonvolatile memory devices by executing the boot loader in the memory controller.

In another embodiment, the inventive concept provides a method of initializing a storage device in a memory system including a memory controller and the storage device, wherein the storage device includes at least one interface chip and a plurality of nonvolatile memory devices connected to the interface chip. The method includes; confirming a layer depth of the at least one interface chip and at least one memory device among the plurality of nonvolatile memory devices and generating configuration information related to the at least one interface chip and the at least one nonvolatile memory device, resetting the at least one interface chip in response to the configuration information, selecting a nonvolatile memory device among the plurality of nonvolatile memory devices storing a boot loader, reading the boot loader from the selected nonvolatile memory device via the at least one interface chip, and initializing the plurality of nonvolatile memory devices by executing the boot loader in the memory controller.

In another embodiment, the inventive concept provides a storage device including; a nonvolatile memory package including at least one interface chip and a plurality of nonvolatile memory devise connected to one of the at least one interface chips, and a memory controller configured to control operation of the nonvolatile memory package. The memory controller executes an initialization operation for the storage device by loading a boot loader stored in one of the plurality of nonvolatile memory devices via the interface chip in response to a nonvolatile memory initialization signal generated by the memory controller, and executing the boot loader in the memory controller to initialize the plurality of nonvolatile memory devices, after resetting the at least one interface chip in response to a reset signal generated by the memory controller.

BRIEF DESCRIPTION OF THE DRAWINGS

The above and other features and advantages of the inventive concept will become more apparent upon consideration of certain embodiments of the illustrated in the accompanying drawings.

DETAILED DESCRIPTION

Figure 1:
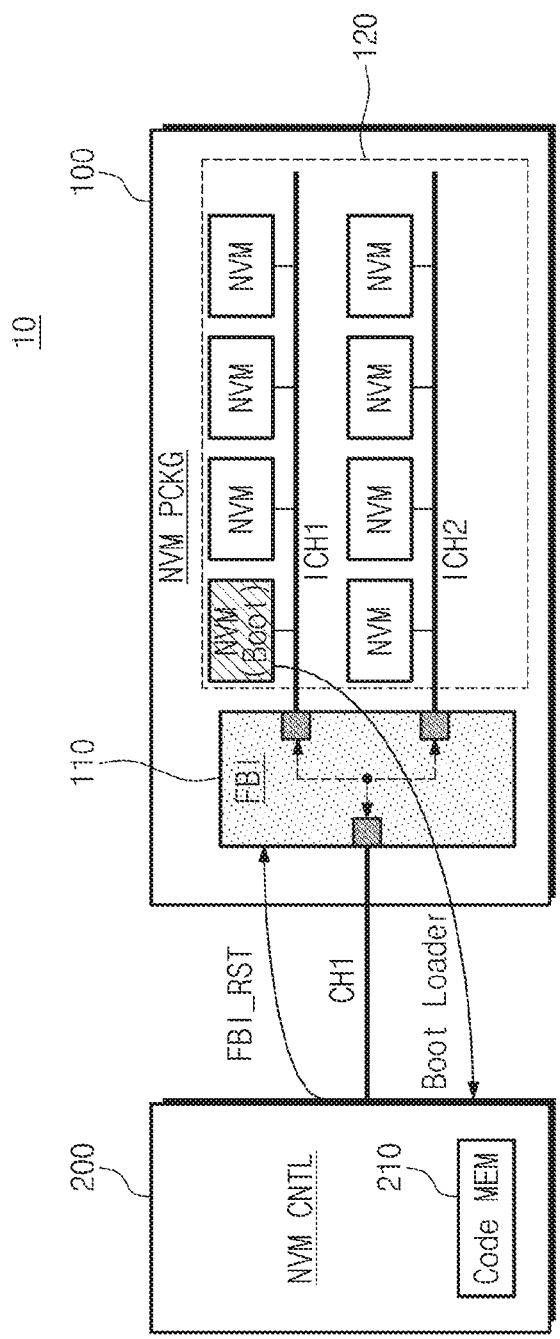
FIG. 1 is a block diagram illustrating a storage device according to embodiments of the inventive concept.

Certain embodiments of the inventive concept will now be described with reference to the accompanying drawings. However, the inventive concept may be variously embodied and should not be construed as being limited to only the illustrated embodiments. Throughout the written description and drawings, like reference numbers denote like or similar elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concept. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion e.g., "between" versus "directly between", "adjacent" versus "directly adjacent", etc.

The terminology used herein is for the purpose of describing particular embodiments only and is not intended to be limiting of example embodiments of the inventive concept. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in relation to certain illustrated embodiments, certain functions, acts, and/or steps may be performed in an order other than the specific order described in relation to illustrated embodiments. Further, two or more functions, acts and/or steps shown as occurring in succession may, in fact, be executed substantially concurrently or may sometimes be executed in a reverse order depending on the functionality, acts and/or steps involved.

Unless otherwise defined, all terms, including technical and scientific terms, used herein have the same meaning as commonly understood by one of ordinary skill in the art to which example embodiments of the inventive concept belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a storage device according to an embodiment of the inventive concept. Referring to FIG. 1, the storage device 10 includes a nonvolatile memory package (NVM PCKG) 100 and a memory controller 200 configured to control the nonvolatile memory package 100 using various control, command, address and data signals communicated via one or more external channel(s) CH1.

The nonvolatile memory package 100 include an interface chip (FBI) 110 and a plurality of nonvolatile memory devices 120 variously connected to the interface chip 110 via one or more of a plurality of internal channels ICH1, ICH2.

Thus, in the illustrated example of FIG. 1, the interface chip 110 is connected on one side (e.g., in a first signal communication direction) to the memory controller 200 via the external channel CH1, and is further connected on another side (e.g., in a second signal communication direction) to one or more internal channels (e.g., first internal channel ICH1 and/or the second internal channel ICH2).

Each of the nonvolatile memory devices NVM 120 may be used to store data. In certain embodiments of the inventive concept, the plurality of nonvolatile memory devices of the nonvolatile memory package 100 may configured as stacked nonvolatile memory device.

The various internal channels (e.g., ICH1, ICH2) may be used to respectively connect the plurality of nonvolatile memory devices NVM 120. In the relatively simple example illustrated in FIG. 1, each one of the internal channels ICH1, ICH2 is used to serially connect four (4) nonvolatile memory devices NVM 120. However, those skilled in the art will understand that different numbers of memory devices, variously connected via two or more internal channels having various connectivity configurations may be used in other embodiments of inventive concept.

Regardless of specific configuration within a NVM package 100, at least one of the nonvolatile memory devices 120 will be used to store at least one copy of a boot loader. Here, the term "boot loader" is used to denote an initialization program capable of partially or completely initializing the storage device 10. Those skilled in the art will recognize that like many contemporary storage devices, certain storage devices according to the inventive concept require an initialization, or memory system resource setting-up, routine before the memory system may be used in normal operation (e.g., the reading and writing (programming) of data). Memory system initialization may include the initialization of hardware, firmware and/or software components, and may be performed when a memory system is powered-on, wakened from a passive state to an operative state, and/or being re-initialized following an operating error. Memory system initialization may be performed as a simple, single and direct routine that initializes all memory system resources, or as a multi-level, iterative and complex initialization routine that selectively initializes memory system resource, and any variation there between. Thus, regardless of the particular nature of a memory system initialization routine, it is assumed that a boot loader stored in one or more of the nonvolatile memory devices 120 is used to control its execution.

In the specific example illustrated in FIG. 1, a boot loader is stored in a single nonvolatile memory device connected to the first internal channel ICH1. However, the programming code of the boot loader may be distributed over more than one of the nonvolatile memory devices 120 as connected to one or both of internal channels ICH1 and ICH2.

The memory controller 200 may be used to control the overall operation of the nonvolatile memory package 100 and its constituent memory devices 120. The memory controller 200 may perform various functions desired to manage the data stored by the memory devices 120 of the nonvolatile memory package 100, such as address mapping, error correction, garbage collection, wear leveling, bad block management, and/or data reconstruction.

During a memory system initialization driven by the boot loader, the memory controller 200 may initially reset the interface chip 110. For example, the memory controller 200 may be used to generate a reset signal (FBI_RST) when the storage device 10 is powered-on, and transmit the reset signal to the interface chip of the nonvolatile memory package 100. The interface chip 110 is reset in response to the reset signal. After resetting the interface chip 110, the memory controller 200 may request and receive the boot loader stored in the nonvolatile memory package 100, and begin execution of an initialization operation defined by the programming code and/or data included in the boot loader.

The initialization operation for the storage device 10 may executed in two general steps. The primary (or first) general step may be controlled by "boot code" stored in the memory controller 200, or a memory external to the nonvolatile memory package 200. In the illustrated example of FIG. 1, it is assumed that boot code is stored in a code memory 210 (e.g., a Read-Only-Memory or ROM) of the memory controller 200. Upon power-up of the memory controller 200, for example, a processor in the memory controller 20 may read the boot code from the code memory 210 and execute the read boot code. Thus, a first general step of an initialization operation may include the reading and execution of boot code by the memory controller 200.

Thereafter, a secondary (or second) general step of the initialization operation may be performed in response to the execution of the boot code. In effect, execution of the boot code may cause the identification, request, receipt and execution of boot loader stored in at least one of the memory devices of the nonvolatile memory package 100. It is this secondary execution of the boot loader driven by the boot code that completes the initialization operation with respect to the nonvolatile memory package 100.

Certain contemporary storage devices seeking to execute an initialization operation without the resetting of an interface chip may fail in so doing. That is, as a memory system transitions from a power-off state to a power-on state, one or more critical operating voltage(s) used by the memory controller, the interface chip, and/or one of the nonvolatile memory devices of the nonvolatile memory package may not reach a necessary minimum level before it is required in the initialization operation. As the result, the initialization operation may fail.

In contrast, since the storage device 10 of FIG. 1 begins execution of an initialization operation only after first resetting the interface chip—even though a critical operating voltage associated with the memory controller, interface chip and/or nonvolatile memory device is not fully stable—a command causing the start of the initialization operation may nonetheless be stably transmitted to one or more nonvolatile memory device(s) 120 of the nonvolatile memory package 100. Therefore, the storage device 10 may stably execute the initialization operation as compared with certain contemporary storage devices.

Figure 2:
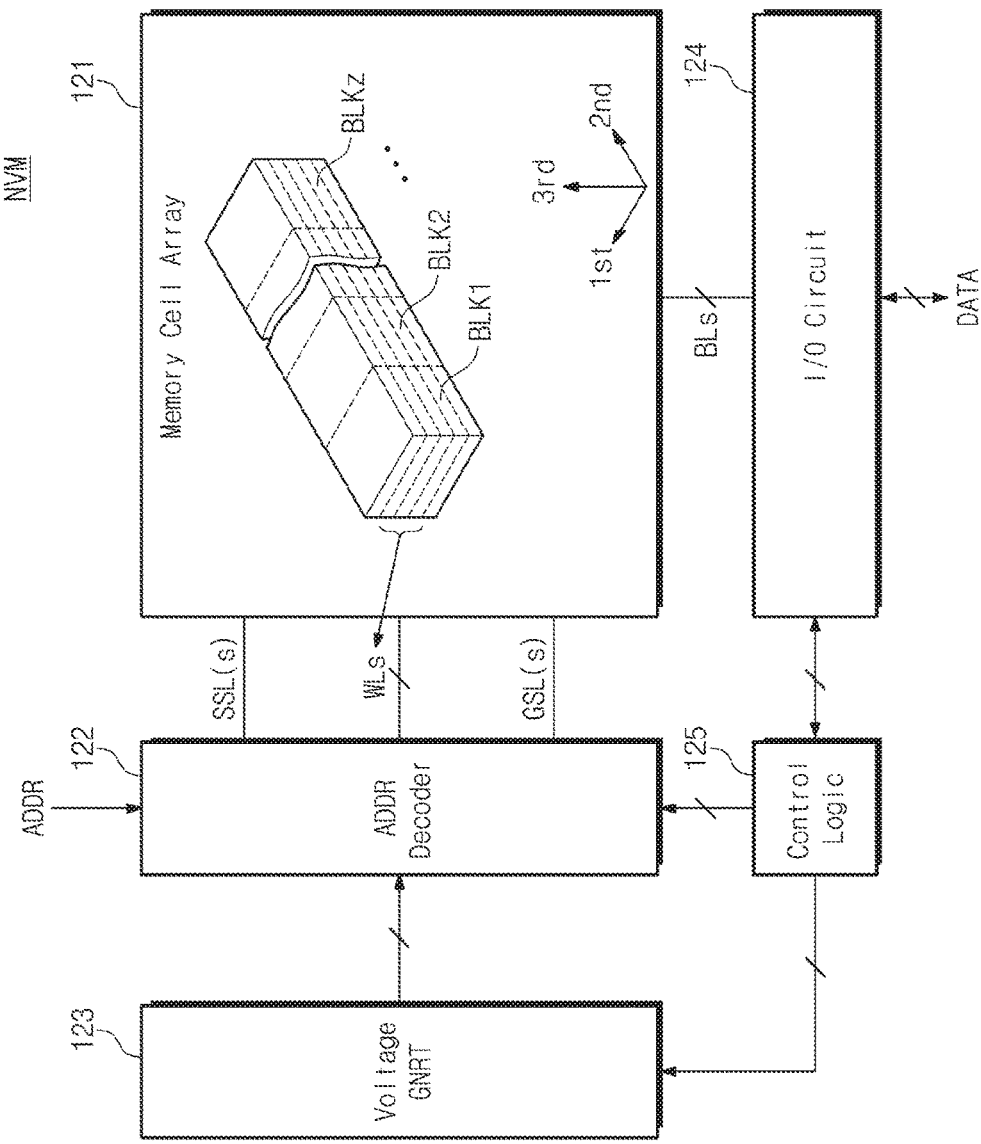
FIG. 2 is a block diagram further illustrating in one example one of the nonvolatile memory devices (NVM) of the storage device of FIG. 1.

FIG. 2 is a block diagram further illustrating in one example a nonvolatile memory device (NVM) of the storage device 10 of FIG. 1. Referring to FIG. 2, the nonvolatile memory device (NVM) includes a memory cell array 121, an address decoder 122, a voltage generation circuit 123, in/output circuit 124, and control circuit 125.

The nonvolatile memory device NVM may be NAND flash memory, vertical NAND (VNAND), NOR flash memory, resistive random access memory (RRAM), phase-change memory (PRAM), magneto resistive random access memory (MRAM), ferroelectric random access memory (FRAM), and spin transfer torque random access memory (STT-RAM). Here, the nonvolatile memory device (NVM) may be implemented with a two dimensional array structure or a three dimensional array structure. As embodiments of inventive concept, the three dimensional memory array may be formed monolithically to one or more physical levels of memory cells having an active region arranged on a circuit regarding to an operation of the memory cells, or a silicon substrate. The circuit of regarding to the operation of the memory cells may be located in the substrate or on the substrate. The term of "monolithically" is used to refer that layers of each level of three dimensional array is deposited on layers of lower level of the three dimensional array.

According to the illustrated embodiment of FIG. 2, a three dimensional, NAND memory array including vertical NAND strings is used, wherein at least one memory cell is located on one of the other memory cells in a defined vertical direction. At least one memory cell may include a charge trap layer. Each of the vertical NAND string may include at least one selection transistor located on the memory cells. The at least one selection transistor may have a structure the same as memory cells, and be formed monolithically together with the memory cells.

Three dimensional memory arrays may be implemented in a plurality of levels, and may include word lines shared between these levels or bit lines. As possible examples of three dimensional memory array that may be used in various embodiments of the inventive concept, U.S. Pat. Nos. 8,553,466; 8,654,587; and 8,559,235, as well as published U.S. Patent Application No. 2011/0233648 are hereby incorporated by reference. In these contexts, various embodiments of the inventive concept may be applied to flash memory devices including a conductivity floating gate as a electron storage layer. Other embodiments of the inventive concept may be applied to a charge trap flash (CTF) including a insulating film as the electron storage layer. In the following written description, it is assumed that the nonvolatile memory devices (NVM) 120 of the nonvolatile memory package 100 are NAND flash memory devices.

In the more specific example of FIG. 2, the memory cell array 121 may include a plurality of memory blocks BLK1~BLKz. Each of the memory blocks BLK1~BLKz may be connected to the address decoder 122 via word lines WLs, at least one string selection line SSL, and at least one ground selection line. Each of the memory blocks BLK1~BLKz may be connected to the in/output circuit 124 via bit lines BLs. In the exemplary embodiment, the word lines may be a layered plate-like structure.

Each of the plurality of memory blocks BLK1~BLKz may include a plurality of string which are three dimensional structure. The three dimensional plurality of string may be arranged according to a first direction and a second direction (different with the first direction), and be arranged with a third direction (perpendicular direction to a plane formed with the first direction and the second direction). Each of the plurality of strings may include at least one string selection transistor, a plurality of memory cells, and at least one ground selection transistor connected in series between a bit line and a common source line CSL. Herein, each of the plurality of memory cells may store at least one or more data bits. In certain embodiments, at least one dummy cell may be included between the at least one string selection transistor and the plurality of memory cells. In other embodiments, at least one dummy cell may be included between the plurality of memory cells and the at least one ground selection transistor.

The address decoder 122 may select one of the plurality of memory blocks BLK1~BLKz in response to address. Also, address decoder 112 may be connected to the memory cell array via word lines WLs, at least one string selection line SSL, and at least one ground selection line GSL. The address decoder 121 may select word lines WLs, string selection line SSL, ground selection line GSL using decoded row address. Also, the address decoder 122 may decode a column address among received address. Herein, the decoded column address may be transmitted to the in/output circuit 124. In exemplary embodiment, the address decoder 122 may include a row decoder, a column decoder, and address buffer.

The voltage generation circuit 123 may generate voltages (program voltage, pass voltage, read voltage, read pass voltage, verify voltage, erase voltage, common source line voltage, well voltage) required for operations.

The input/output (I/O) circuit 124 may be connected to the memory cell array 121 via the bit lines BLS. The I/O circuit 124 may receive the decoded column address from the address decoder 122. The I/O circuit 124 may select bit lines BLs using the decoded column address.

The I/O circuit 124 may store data to be programmed during a program operation, and include a plurality of page buffers to store data to be read during a read operation. Herein, each of the plurality of page buffers may include a plurality of latches. In program operation, data stored in the page buffers may be programmed to a page corresponding to a selected memory block via the bit lines BLs. During a read operation, data which is read from the page corresponding to the selected memory block may be stored at the page buffers via bit lines BLs. The I/O circuit 123 may read data from a first region of the memory cell arrasy 121, and store the read data to a second region of the memory array 121. For example, the I/O circuit 124 may execute a copy-back operation.

The control logic 125 may be used to control the overall operation (e.g., the various execution of program, read, and/or erase operations) of the memory device 100. The control logic 125 may work in response to control signal CTRL or a command received from the external.

Figure 3:
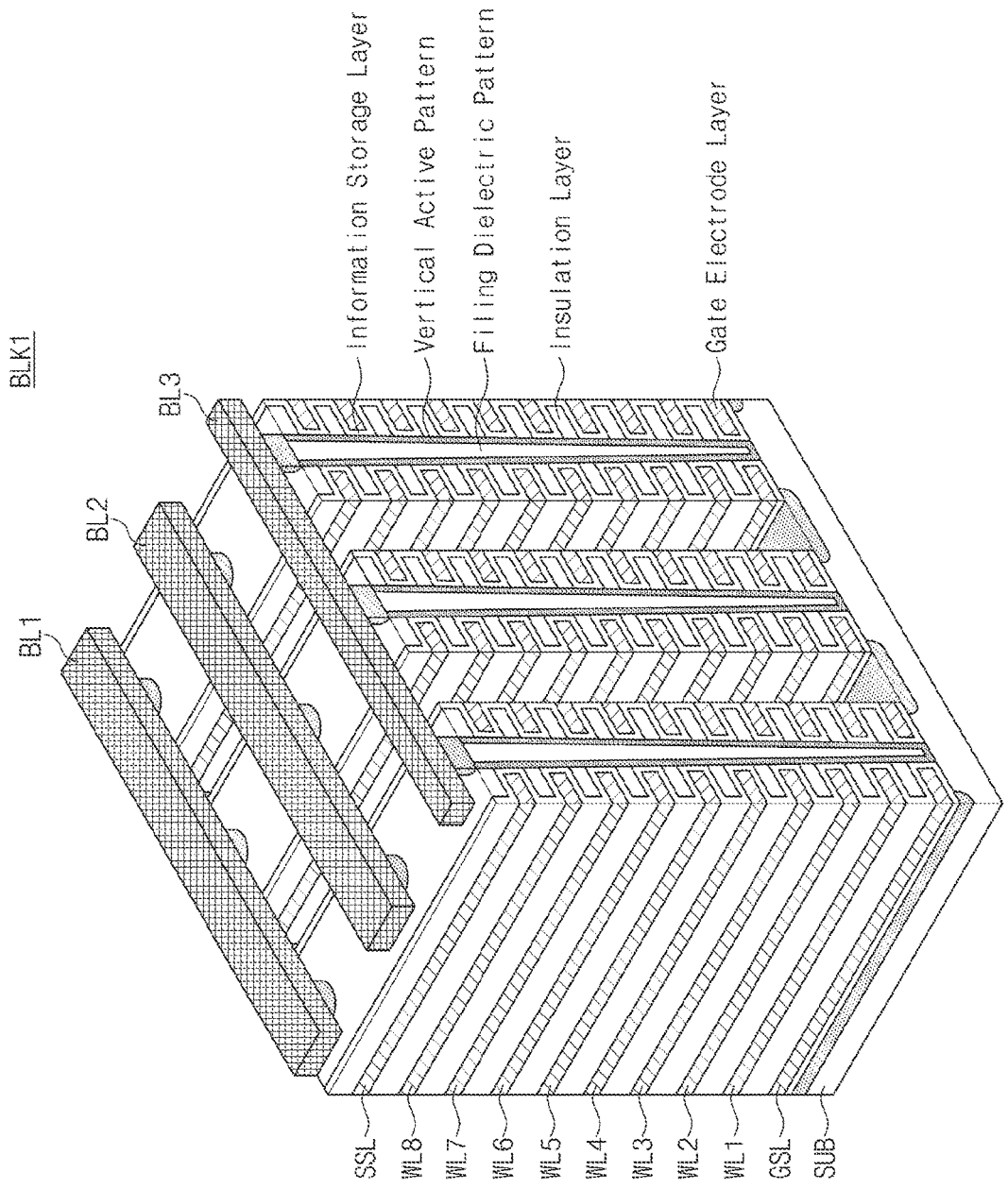
FIG. 3 is a diagram further illustrating in one example the memory block (BLK1) of FIG. 2.

FIG. 3 is a diagram further illustrating in one example the memory block (BLK1) of FIG. 2 according to an embodiment of the inventive concept. Referring to FIG. 3, the memory block BLK1 may be formed in a direction perpendicular to the substrate (SUB), where an n+ doping region may be formed in the substrate SUB.

A gate electrode layer and an insulation layer are then sequentially deposited on the substrate. A gate electrode layer and an insulation layer are then sequentially deposited on the substrate. A charge storage layer is formed between the gate electrode layer and the insulation layer.

If the gate electrode layer and the insulation layer are patterned in a vertical direction, a V-shaped pillar is formed. The pillar may thus be connected with the substrate via the gate electrode layer and the insulation layer. An outer portion 'O' of the pillar forms a semiconductor channel as a vertical active pattern, while an inner portion 'I' forms an insulation material (e.g., silicon oxide) as a filing dielectric pattern around the semiconductor channel.

The gate electrode layer of the memory block BLK1 is connected to a ground selection line GSL, a plurality of word lines WL1 to WL8, and a string selection line SSL. In this manner, the pillar of the memory block BLK1 is connected with a plurality of bit lines BL1 to BL3. FIG. 3 illustrates an example in which one memory block BLK1 has two (2) ground/string selection lines and eight (8) word lines WL1 to WL8. However, at least some embodiments of the inventive concept may have many different signal line definitions.

Figure 4:
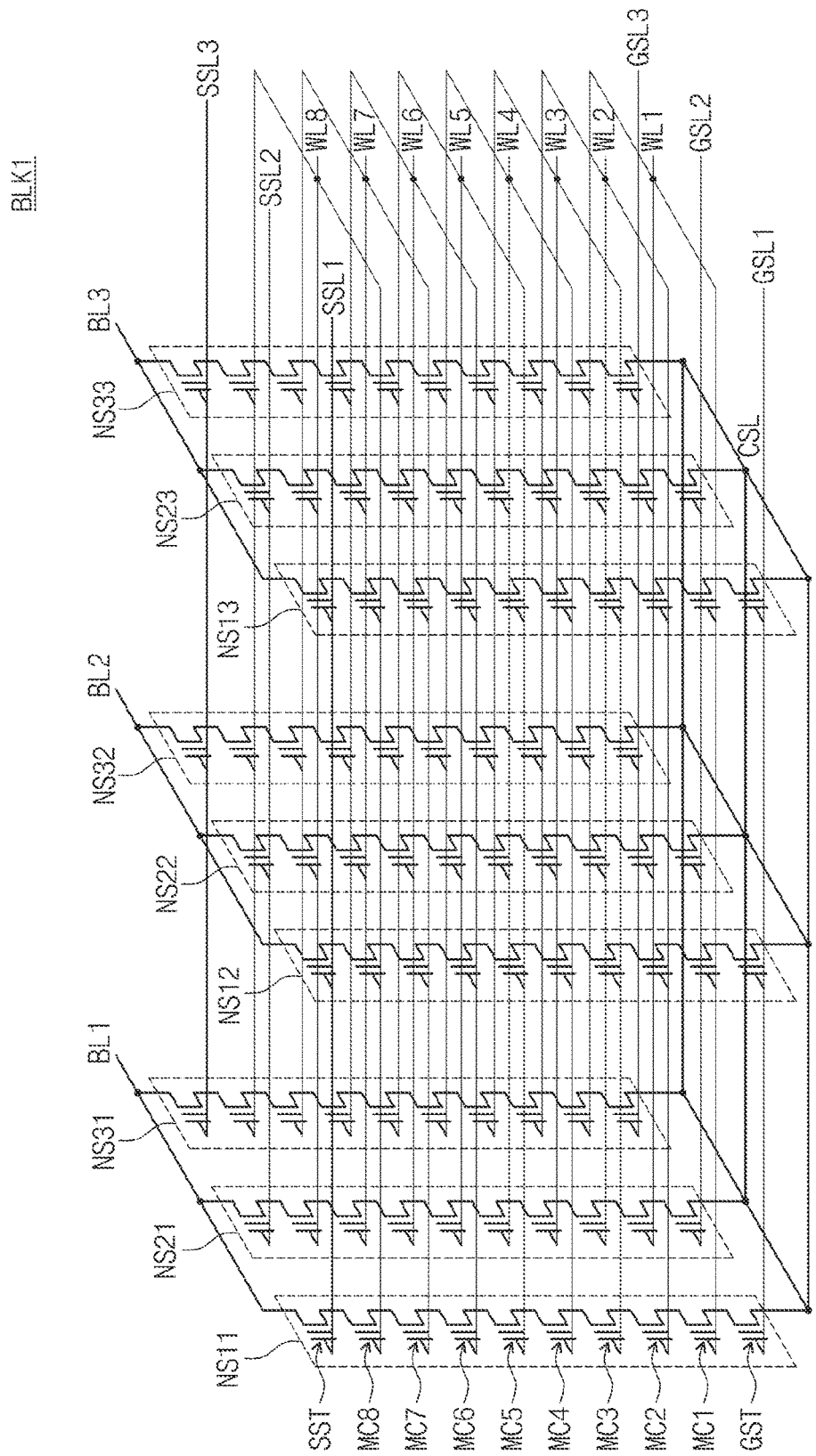
FIG. 4 is a partial equivalent circuit diagram for the memory block BLK1 of FIG. 3 according to an embodiment of the inventive concept.

FIG. 4 is a partial, equivalent circuit diagram for the memory block BLK1 shown in FIG. 3. Referring to FIG. 4, cell strings CS11 to CS33 are connected between it lines BL1 to BL3 and a common source line CLS. Each cell string (e.g., CS110) includes a string selection transistor SST, a plurality of memory cells MC1 to MC8, and a ground selection transistor GST.

The string selection transistor SST may be connected with string selection lines SSL. The string select line is separated with SSL1 to SSL3. The ground selection transistor GST may be connected with ground selection lines GSL1 to GSL3. In certain embodiments, the ground selection lines GSL1 to GSL3 may be connected each other. A string selection transistor SST may be connected with a bit lines, and a ground selection transistor GST may be connected with a common source line CLS.

The memory cells MC1 to MC8 may be connected with corresponding word lines WL1 to WL8, respectively. A group of memory cells connected to a word line and programmed simultaneously is designated as "page". The memory block BLK1 includes a plurality of pages. Also, a word line maybe connected with a plurality of pages. Referring to FIG. 4, a word lines (e.g., WL4) having the same height from the common source line CSL may be commonly connected with 3 pages.

Each memory cell may store one or more data bits. A memory cell which stores one data bit is used to refer to single level cell SLC or single bit cell. A memory cell which stores two or more data bits is referred to as a multi-level (or multi-bit) cell (or MLC). In a case assuming the use of 2-bit MLC, a single physical page of memory cells will be used to store two logical pages of data.

Figure 5:
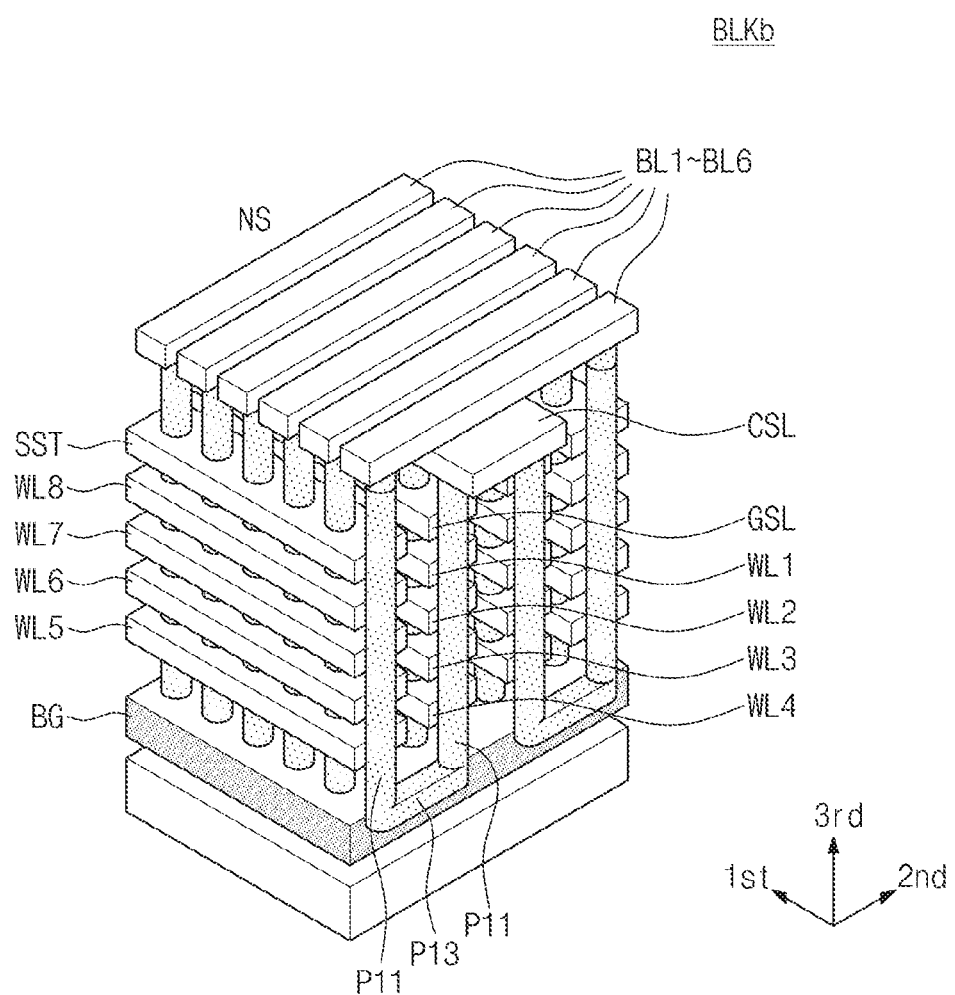
FIG. 5 is a diagram further illustrating in another example the memory block BLK1 of FIG. 2.

FIG. 5 is a diagram further illustrating in another example a generic memory block (BLKb) that may be used as a memory block in FIG. 2. Referring to the FIG. 5, for convenient description, it is assumed that the memory block (BLKb) includes only four (4) word lines. The memory block is embodied pipe-shaped bit cost scalable (PbiCS) structure to connect bottoms of memory cells connected in series. The memory block (BLKb) may include strings (NS) with m*n, where 'm' and 'n' are natural numbers.

In FIG. 5, it is assumed that m=6 and n=2. Each strings (NS) may include memory cells (MC1~MC8) connected in series. The first upper part of the memory cells (MC1~MC8) may be connected with the string selection transistor (STT). The second upper part of the memory cells (MC1~MC8) may be connected with the ground selection transistor (GST). The bottom of the memory cells (MC1~MC8) is connected with pipe.

Memory cells of the string (NS) may be formed by layered with a plurality of semiconductor layer. Each of the strings (NS) may include the first pillar (PL11), the second pillar (PL12), and a pillar connection (PL13) connecting the first pillar(PL11) and the second pillar (PL12). The first pillar (PL11) may be connected to the bit line (for example, BL1) and the pillar connection (PL13). The first pillar (PL11) may be formed by penetrating through the string selection line (SSL) and word lines (WL5~WL8). The second pillar (PL12) may be connected to the common source line (CSL) and the pillar connection (PL13). The second pillar (PL12) may be formed by penetrating through the ground selection line (GSL) and word lines (WL1~WL4). As illustrated in FIG. 4, the string (NS) may be formed U shape pillar.

Further, a back gate (BG) may be formed on the substrate. The pillar connection (PL13) may be formed in the back gate (BG). In the illustrated example of FIG. 5, the back gate (BG) may exist in common with the block (BLKb), but the back gate (BG) may be separated from the back gate of another block.

With the foregoing examples in mind, the nonvolatile memory package NVM PCKG shown in FIG. 1 may perform channel distribution via a single layer interface chip 110. However, in other embodiments of the inventive concept, the nonvolatile memory package NVM PCKG may perform channel distribution via multiple layer interface chips.

Figure 6:
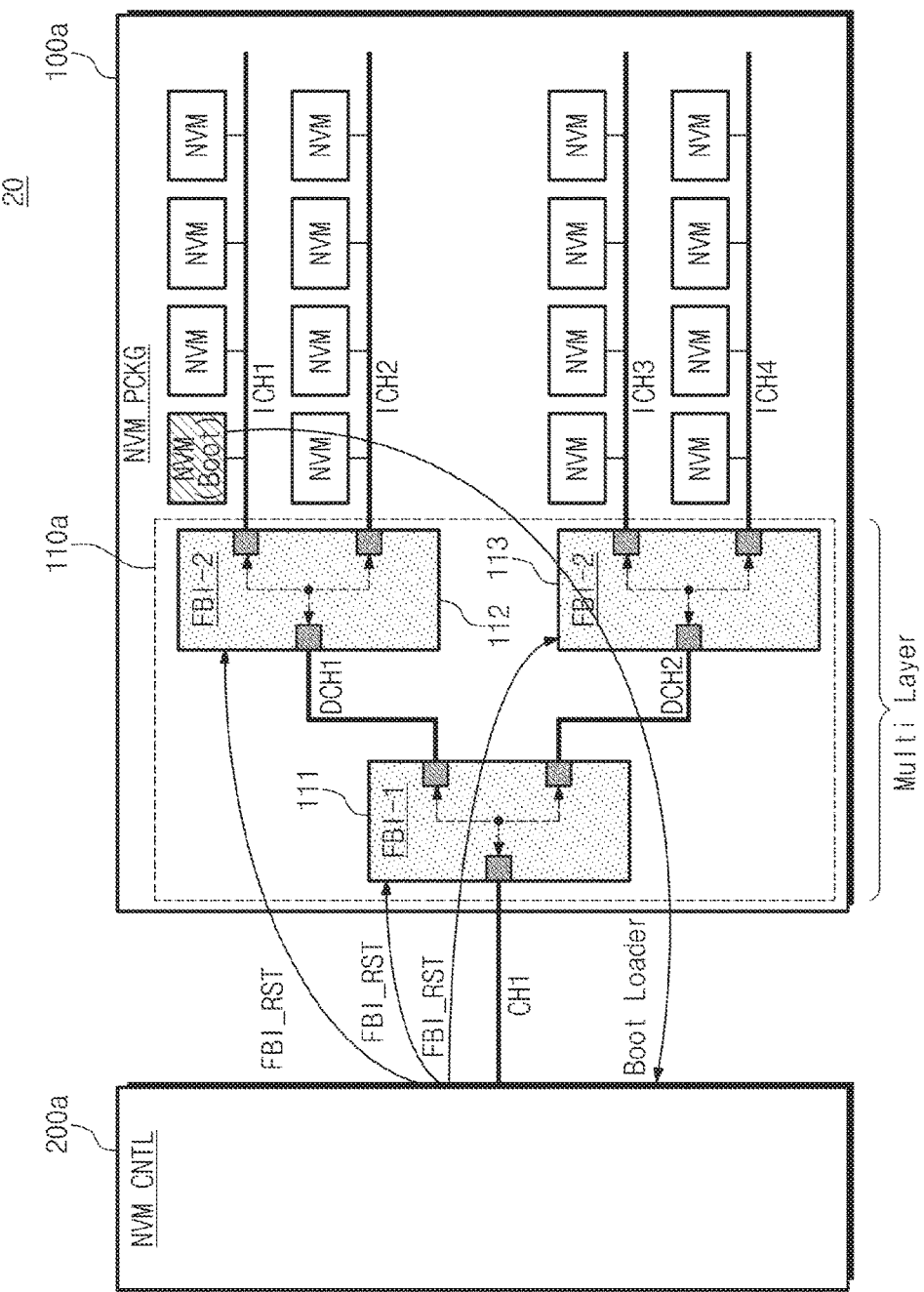
FIGS. 6, 7 and 8 are respective block diagrams variously illustrating storage devices according to embodiments of the inventive concept.

FIG. 6 is a block diagram illustrating a storage device 20 according to an embodiment of the inventive concept. Referring to FIG. 6, the storage device 20 includes a nonvolatile memory package 100a, and a memory controller 200a controlling the nonvolatile memory package 100a.

The nonvolatile memory package 110a includes a plurality of nonvolatile memory devices connected via internal channels ICH1~ICH4, and a interface circuit 110a including multi-layer interface chips 111,112, 113. Thus, in FIG. 6 for convenience of description, it is assumed that the interface circuit 110a is embodied with two (2) layers. However, the interface circuit 110a might be implemented using any reasonable number of layer.

The interface circuit 110a includes a first interface chip 111 disposed in a first layer, as well as a second interface chip 112 and a third interface chip 113. Here, the first interface chip 111 essentially divides an external channel CH1 into two (2) branch channels, DCH1 and DCH2. The first and second internal channels ICH1, ICH2 divide from the first branch channel DCH1, while the third and fourth internal channels divide from the second branch channel DCH2.

In the illustrated example of FIG. 6, the first, second and third interface chips 111, 112, 113 are assumed to be similarly implemented. Further, it is assumed that each one of the first, second and third interface chips 111, 112, 113 is similarly reset in response to a reset signal (FBI_RST) provided during an initialization operation. However, in other embodiments of the inventive concept, the first, second and third interface chips 111, 112, 113 may be respectively reset by different reset signals.

Thus, in certain embodiments of the inventive concept, a reset condition may be commonly defined for each one of the first, second, and third interface chips (111, 112, 113). However, different reset conditions may be defined for the first, second, and third interface chips (111, 112, 113). For example, a first reset condition may be applied to the first interface chip 111 disposed in the first layer, and a different (second) reset condition may be applied to the second and third interface chips 112, 113 disposed in the second layer.

Extending the example of FIG. 6, once the first, second, and third interface chips 111, 112, 113 have been reset during an initialization operation, the memory controller 200a may be used to read a boot loader from at least one nonvolatile memory NVM, and then execute the boot loader to perform the initialization operation.

The boot loader of FIG. 6 is stored in a nonvolatile memory NVM connected to the first internal channel ICH1. However, the storage location of the boot loader of inventive concept is not limited with this.

Each of storage device of FIG. 1 through FIG. 6, is illustrated that the memory controller is connected to the nonvolatile memory package via the one of channel CH1, however, the inventive concept is not limited thereto. The storage device of inventive concept may be implemented that the memory controller is connected with the nonvolatile memory package via a plurality of channels.

Figure 7:
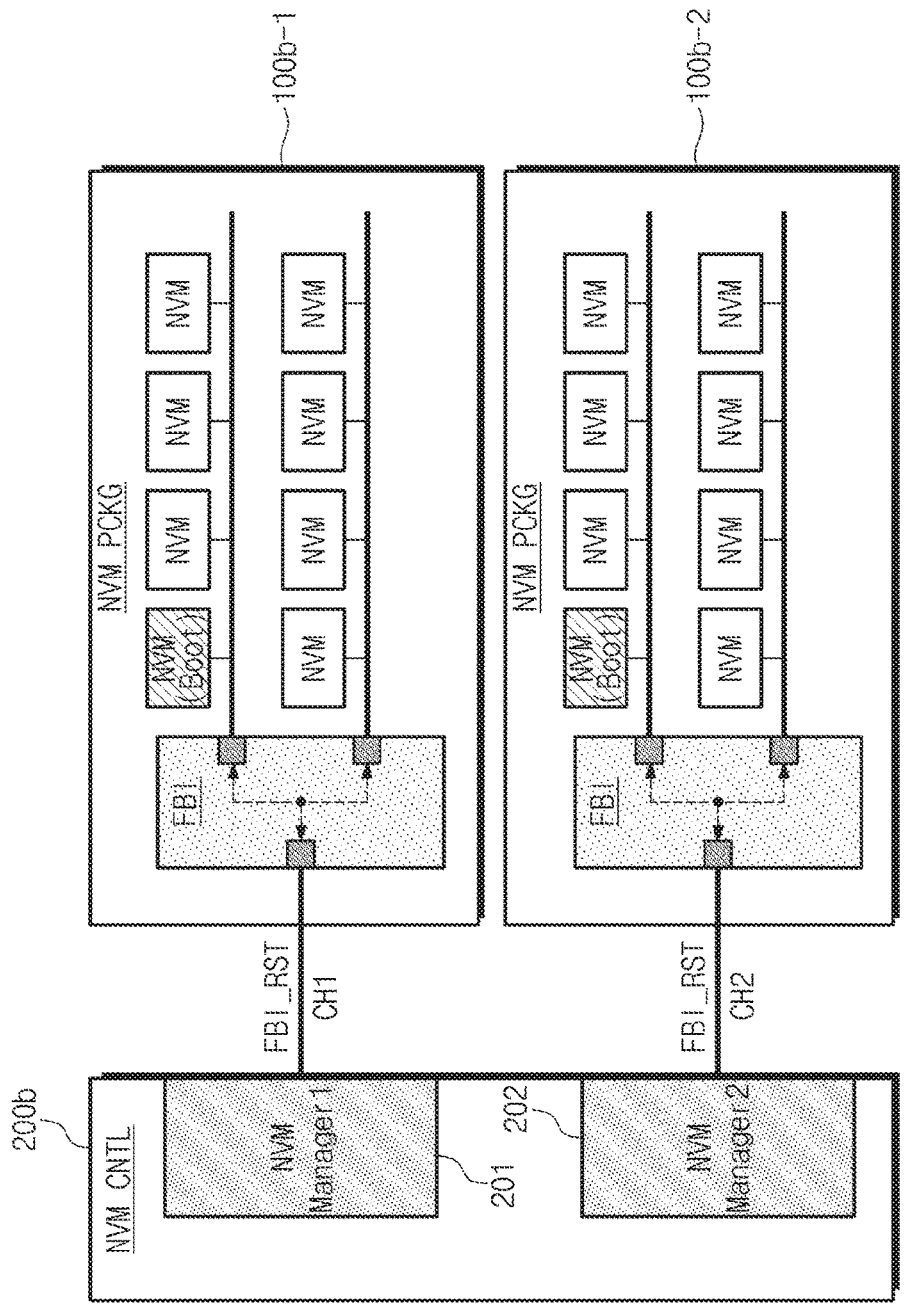

FIG. 7 is a block diagram illustrating a storage device 30 according to the another embodiment of inventive concept. Referring to FIG. 7, the storage device 30 includes first and second nonvolatile memory packages 100-1 and 100-2, as well as a memory controller 200b. For convenience of description in FIG. 7, only two (2) nonvolatile memory packages 100b-1, 100b-2 are illustrated, however, the inventive concept is not limited to this number.

The first nonvolatile memory package 100b-1 is connected to the memory controller 200b via a first external channel CH1. The first nonvolatile memory package 100b-1 may be implemented the same as the nonvolatile memory package 100 of FIG. 1. The second nonvolatile memory package 100b-2 is connected to the memory controller 200b via a second channel external CH2. The second nonvolatile memory package 100b-2 may be implemented the same as the nonvolatile memory package 100 of FIG. 1

Here, the memory controller 200b may include a first nonvolatile memory manager 201 and a second nonvolatile memory manager 202. The first nonvolatile memory manager 201 may control the first nonvolatile memory package 100b-1, and the second nonvolatile memory manager 202 may control the second nonvolatile memory package 100b-2, where the first and the second nonvolatile memory manager 201, 202 may be operated independently with respect to one another.

In the illustrated example of FIG. 7, two (2) copies of the same boot loader, or two different boot loaders, are respectively stored in two (2) nonvolatile memory devices (NVM) respectively associated with the first nonvolatile memory package 100b-1 and second nonvolatile memory package 100b-2. Hence, a boot loader may be retrieved from NVM by the memory controller 200b using either the first or second external channels CH1 and CH2. The boot loader of inventive concept may be stored to at least one nonvolatile memory NVM connected to the channels CH1, CH2.

Figure 8:
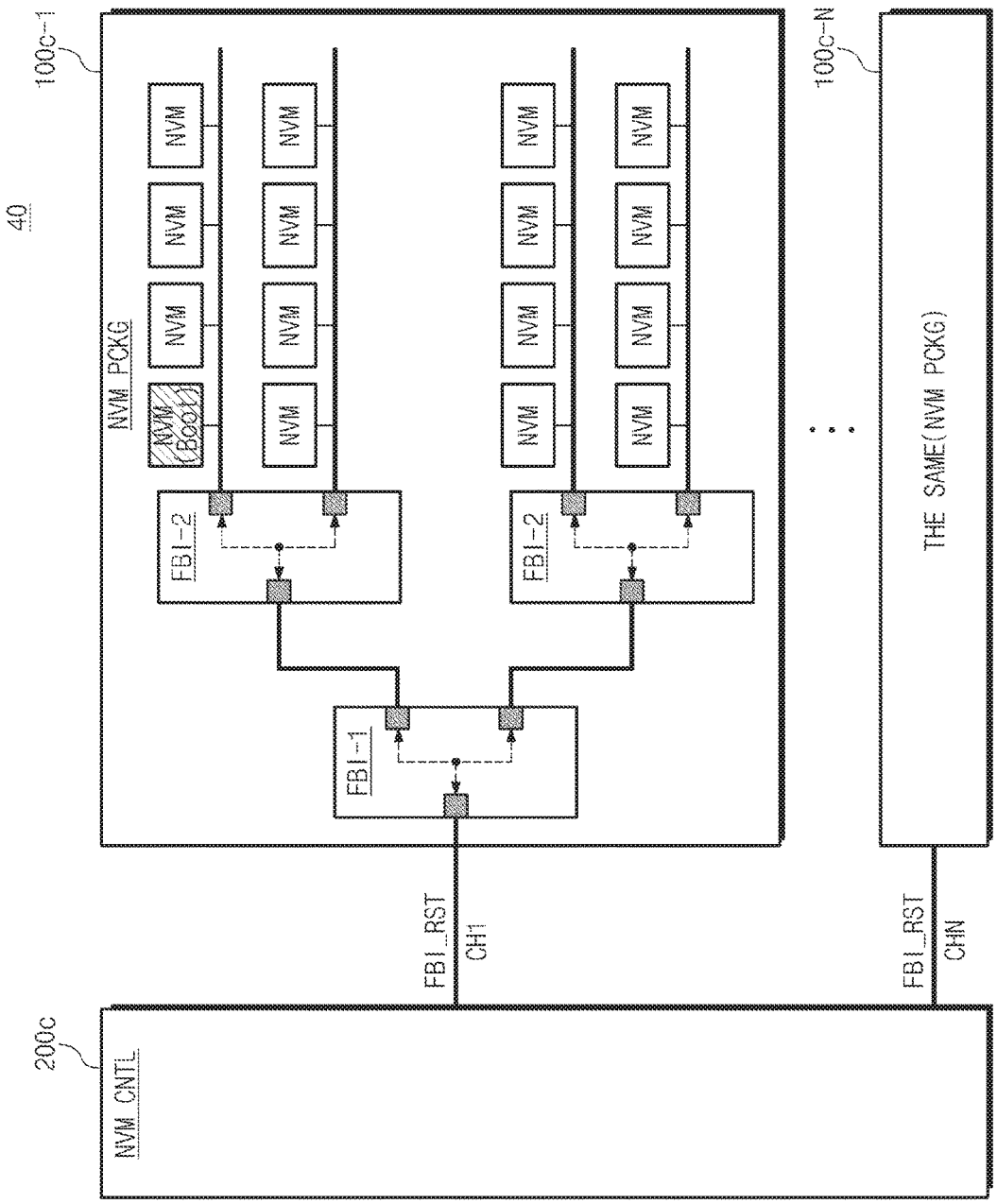

FIG. 8 is a block diagram illustrating a storage device 40 according to another embodiment of inventive concept. Referring to FIG. 8, the storage device 40 includes a plurality of nonvolatile memory packages 100c-1 through 100c-N respectively connected to a memory controller 200c via one of a plurality of channels CH1, . . . CHN, where 'N' is integer greater than 1. Here, each one of the plurality of nonvolatile memory packages 100c-1 through 100c-N may be similarly implemented to the nonvolatile memory package 100a of FIG. 6.

Figure 9:
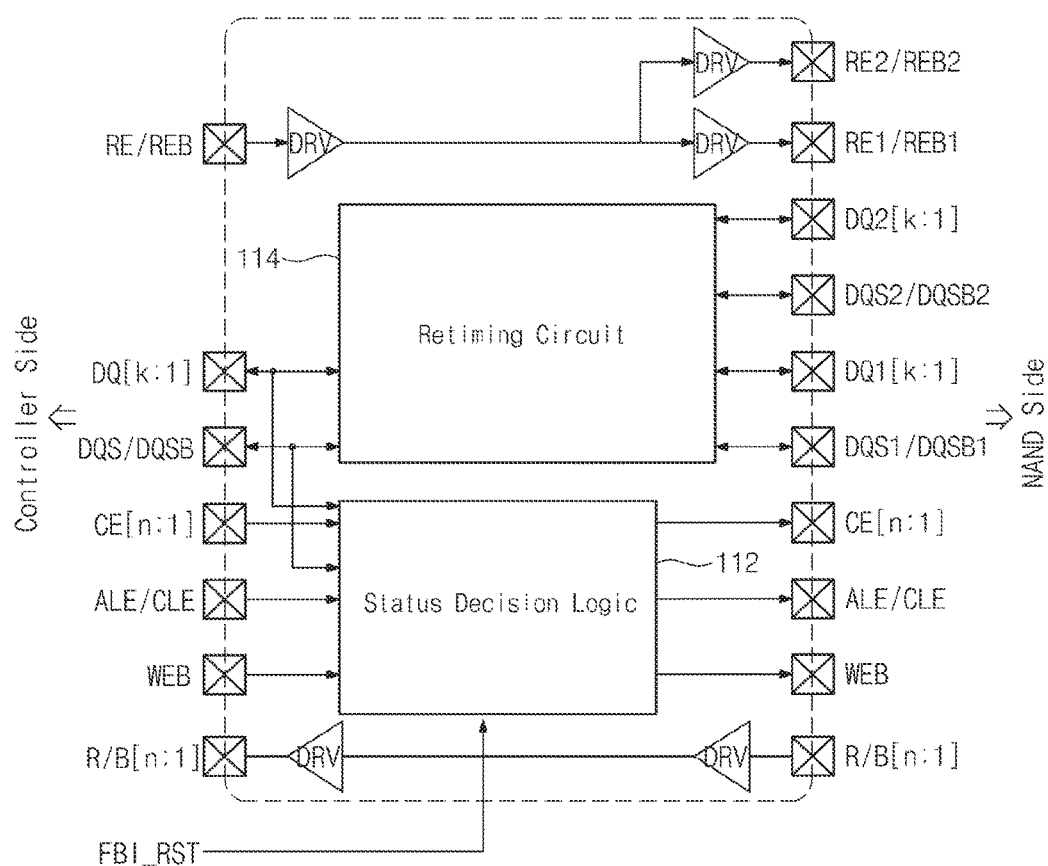
FIG. 9 is a block diagram further illustrating in one example the interface chip 110 of FIG. 6.

FIG. 9 is a block diagram further illustrating in one example the interface chip 110 of FIG. 1 according to an embodiment of inventive concept. Referring to FIG. 9, the interface chip 110 includes status decision logic 112 and a retiming circuit 114. For convenience of description with respect to FIG. 9, it is assumed that interface chip 110 operates as an interface with one or more NAND flash memory device(s).

The status decision logic 112 may be used to generate at least one selection signal determining an operating mode (e.g., a receiving mode or a transmitting mode) for the retiming circuit 114. One or more control signals may be used of varying definition, however the illustrated example of FIG. 9 shows the use of control signals such as (CE[n:1], REB, ALE/CLE, WEB, DQS/DQSB) or data signals (DQ[k:0], where 'n' and 'k' are integers greater than 1. Within this constellation of exemplary control signals, the status decision logic 112 may be reset in response to a reset signal (FBI_RST). That is, some or all of the various internal configurations for circuits blocks within the status decision logic 112 may be reset by the application of the reset signal.

The retiming circuit 114 may be used to select an operating mode in response to one or more selection signal(s) received from the status decision logic 112, and/or one or more timing control signals (e.g., data strobe signals (DQS/DQSB) and/or data signals DQ[k:0]). In certain embodiments of the inventive concept, the retiming circuit 114 may include at least one clock-based sampler, and a delay locked loop (DLL) generating a control signal applied to the sampler. In other embodiments, the retiming circuit 114 may include at least one clock-based sampler, and delay cells generating a clock applied to the sampler. Indeed, those skilled in the art will understand from the foregoing that the retiming circuit 114 may be variously implemented to control the timing of data signals being communicated between the memory controller and NAND flash memory device(s).

Still referring to FIG. 9, certain exemplary relationships between input/output is illustrated. Thus, data pads receiving and/or transmitting data signals DQ[k:1] may be connected via the retiming circuit 114 to at least one of first internal data pads receiving and/or transmitting the first internal data signals DQ1[k:1] and the second internal data pads receiving and transmitting the second internal data signals DQ2[k:1]. Data strobe pads receiving and/or transmitting the data strobe signals DQS/DQSB may be connected via the retiming circuit 114 to at least one of the first internal data strobe pads receiving and/or transmitting the first data strobe signals DQS1/DQSB1 and the second internal data strobe pads receiving and/or transmitting the second data strobe signals DQS2/DQSB2.

Control signal pads receiving read enable signals RE/REB from the memory controller 200 via output drivers may be connected to the first internal read enable pads transmitting the first read enable signals RE1/REB1, and the second internal read enable pads transmitting the second read enable signals RE2/REB2 to NAND flash memory device(s).

Chip enable pads receiving the chip enable signals CE[n:1] from the memory controller 200 may be connected to the internal chip enable pads transmitting the chip enable signals CE[n:1] to the NAND flash memory device(s) via the status decision logic circuit 112.

The address latch enable/command latch enable pads receiving the address latch enable signal/command latch enable signal ALE/CLE from the memory controller 200, via the status decision logic circuit 112, may be connected to the internal address latch enable/command latch enable pads transmitting the address latch enable signal/command latch enable signal ALE/CLE, to the NAND flash memory.

The write enable pads receiving the write enable signal WEB from the memory controller 200, via the status decision logic circuit 112, may be connected to the internal write enable pad transmitting the write enable signal WEB to the NAND flash memory.

The internal RnB pads receiving the RnB signals Rnb[n:1] from the NAND flash memory, via the output drivers, may be connected to the RnB pads transmitting the RnB signals RnB[n:1]. In exemplary embodiment, the RnB signals RnB[n:1] may be implemented optionally to be bypass. The pad connection relation of the inventive concept is not limited thereto.

With the foregoing exemplary embodiments in mind, various operational ladder diagrams are set forth in FIGS. 10, 11, 12 and 13 that further illustrated execution of an initialization operation by various storage devices according to embodiments of the inventive concept.

Figure 10:
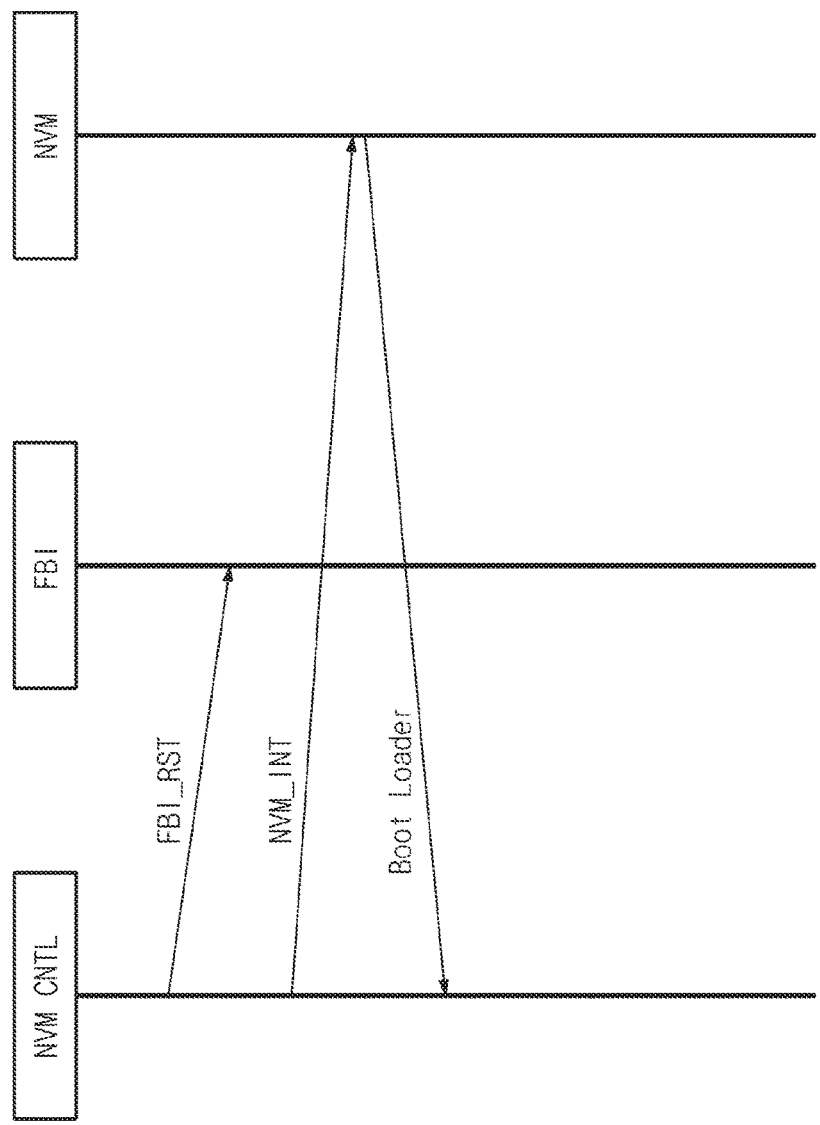
FIGS. 10, 11, 12 and 13 are respective operational ladder diagrams variously and conceptually illustrating initialization operation(s) for certain storage devices.

Referring to FIGS. 1 and 10, when the storage device 10 of FIG. 1 transitions from a power-off state to a power-on state (e.g., receives an initialization command from an external host), the memory controller 200 executes a first general initialization step by retrieving and executing boot code stored to the boot memory 210. In response to execution of the boot code, the memory controller 200 controls the execution of a second general initialization step in conjunction with the nonvolatile memory package 100. Thus, upon execution of the boot code, the memory controller 200 may generate a reset signal (FBI_RST) and provide the reset signal to the interface chip 110. And the interface chip 110 effectively resets (e.g., executes an internal reset operation) in response to the reset signal (RBI_RST).

Following reset of the interface chip 110, the memory controller 200 may transmit a nonvolatile memory initialization signal (NVM_INT) to the nonvolatile memory device NVM via the interface chip 110. Here, the nonvolatile memory initialization signal (NVM_INT) may be generated after the predetermined time delay following transmission of the reset signal (FBI_RST). Alternately, the provision of the nonvolatile memory initialization signal (NVM_INT) may follow an affirmative indication that the reset operation has been completed. The nonvolatile memory device NVM, in response to the initialization signal NVM_INT, reads the stored boot loader, and transmits the read boot loader to the memory controller via the interface chip 110. The memory controller 200 may initialize each one of the nonvolatile memory devices 120 of the nonvolatile memory package 100 using the boot loader.

However, an initialization operation for a storage device according to various embodiments of the inventive concept may additionally check for interface layer depth(s).

Figure 11:
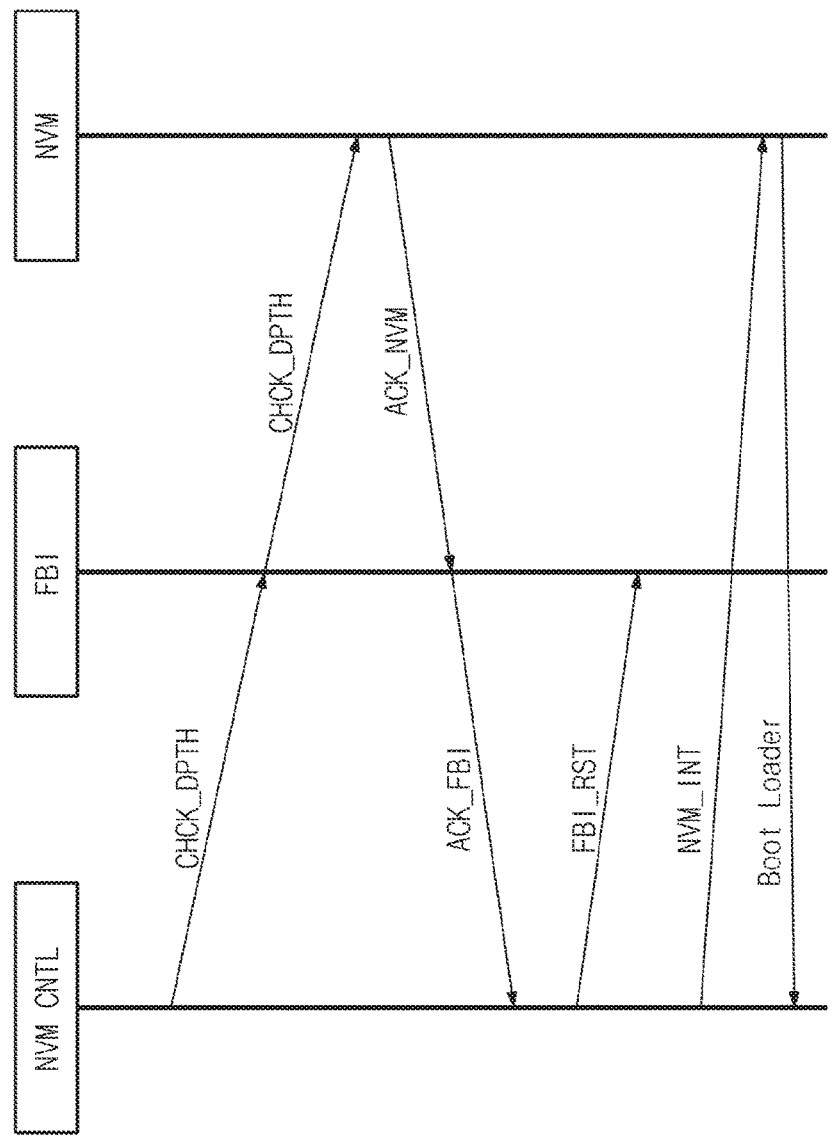
Figure 12:
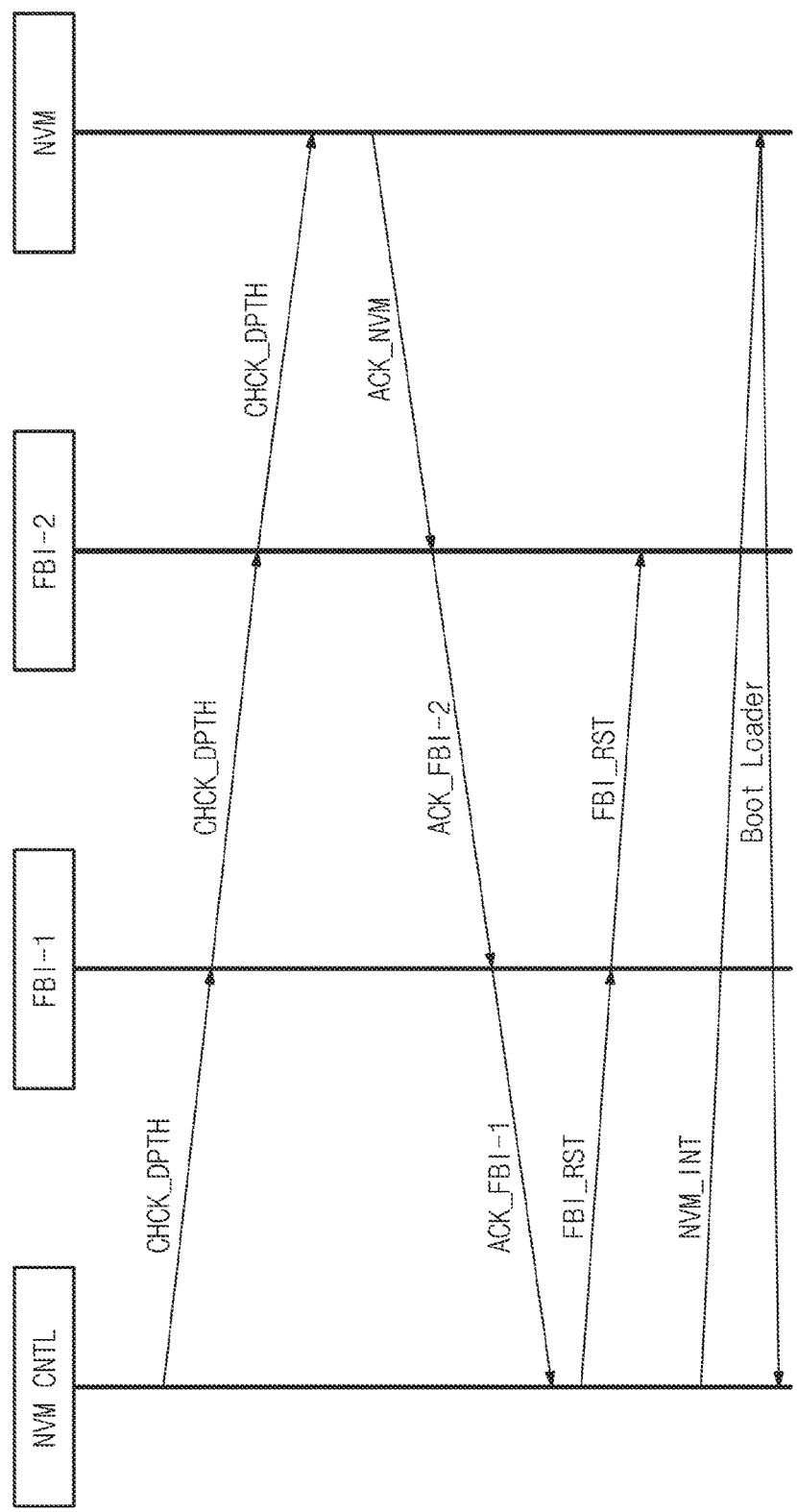
Figure 13:
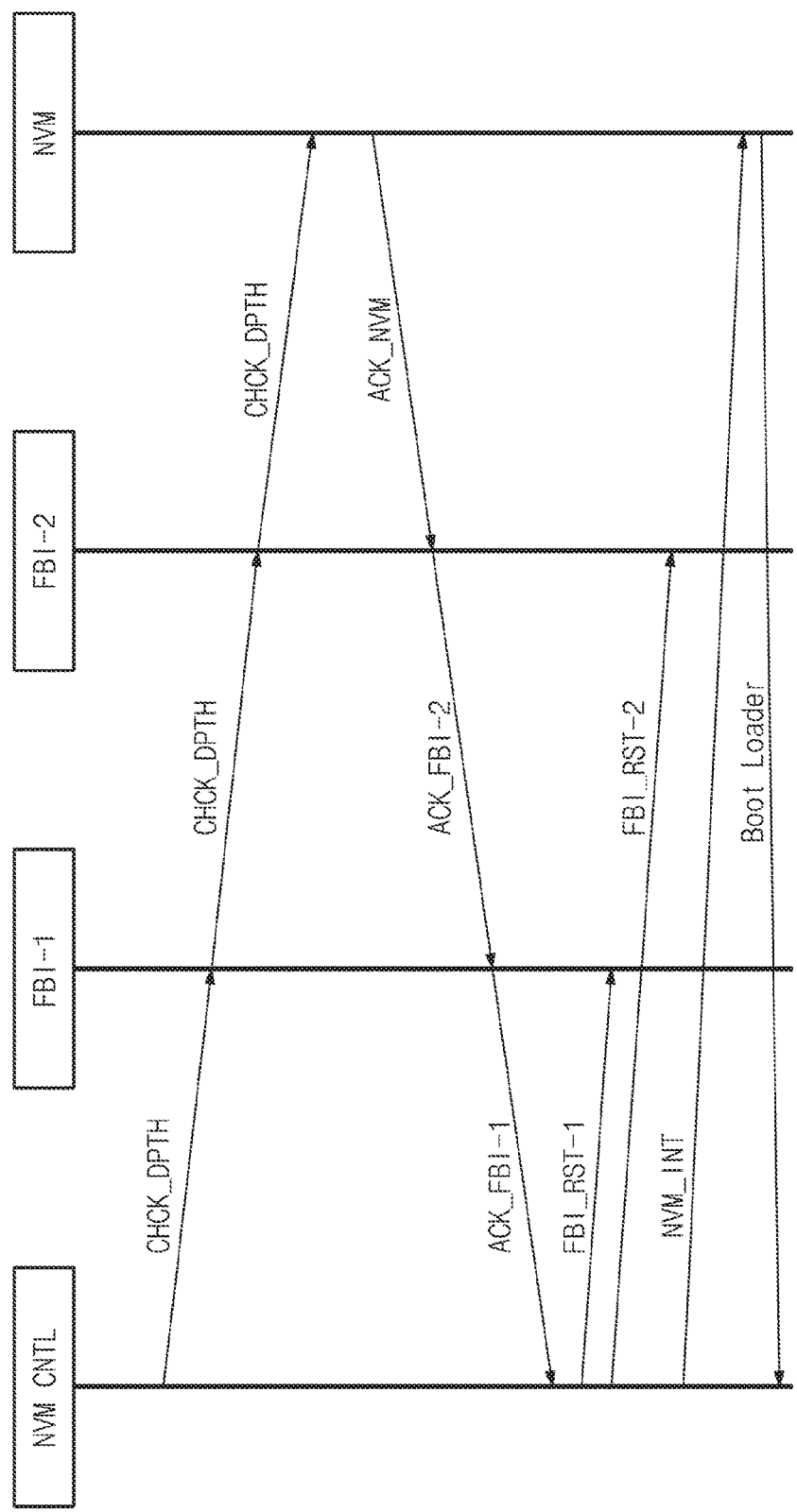

Accordingly, referring to FIGS. 1 and 11, an initialization operation for the storage device 10 may further include querying an interface depth for particular nonvolatile memory device(s). This may be accomplished in certain embodiments of the inventive concept by transmitting a layer depth check command (CHCK_DPTH) from the memory controller 200 to a nonvolatile memory device 120 via the interface chip 110 upon execution of the initialization operation.

Thus, the layer depth check command (CHCK_DPTH) may be generated by the memory controller 200 and transmitted to the interface chip 110. Thereafter, the interface chip 110 will transmit the layer depth check command (CHCK_DPTH) to one or more of the nonvolatile memory device 120. Upon receipt of the layer depth check command (CHCK_DPTH), the nonvolatile memory device 120 will generate a nonvolatile memory acknowledgement signal (ACK_NVM) and transmit it to the interface chip 120. Here, the nonvolatile memory acknowledgement signal (ACK_NVM) will include certain configuration, disposition, control and/or connectivity information (hereafter, regardless of specific information content, "configuration information") related to one or more nonvolatile memory devices 120 and/or associated internal channel(s). The interface chip 110 will then generate a interface chip acknowledgment signal (ACK_FBI) in response to the nonvolatile memory acknowledgment signal (ACK_NVM) and transmit it to the memory controller 200. Here, the interface chip acknowledgement signal (ACK_FBI) includes the configuration information related to one or more nonvolatile memory devices 120 and/or associated internal channel(s), as well as certain configuration information associated with the interface chip 110. From this point in the operational flow, the initialization operation summarized in FIG. 11 proceeds as previously described with respect to the initialization operation of FIG. 10.

In this manner, embodiments of the inventive concept consistent with the example of FIG. 11 are able to obtain "interface layer depth information", and control the further execution of an initialization operation for the storage device 10 in response to same.

Referring now to FIGS. 6, 10, 11 and 12, an initialization operation for the storage device 20 further includes multi layer depth check(s) similar to the approach described in relation to FIG. 11.

Upon beginning an initialization operation, the memory controller 200a generates a layer depth check command (CHCK_DPTH), and transmits this to the first interface chip FBI-1 111. Hereafter, the first interface chip FIB-1 transmits the layer depth check command (CHCK_DPTH) to the second interface chip FBI-2 (112 or 113). Then, the second interface chip FBI-2 transmits the layer depth check command (CHCK_DPTH) to one or more nonvolatile memory devices connected via one or more associated, internal channel(s). A nonvolatile memory device NVM (assuming only one responsive NVM to simplify this description) generates a nonvolatile memory acknowledgement signal (ACK_NVM) in response to the layer depth check command (CHCK_DPTH), and transmits it to the second interface chip FBI-2. Here, the nonvolatile memory acknowledgement signal (ACK_NVM) includes the nonvolatile memory configuration information.

In turn, the second interface chip FBI-2 generates the second interface chip acknowledgment signal (ACK_FBI-2) in response to the nonvolatile memory acknowledgment signal (ACK_NVM), and transmits this to the first interface chips FBI-1. Herein, the second interface acknowledgement signal (ACK_FBI-2) includes the nonvolatile memory configuration information as well as the second interface chip configuration information. Then, the first interface chip FBI-1 generates a first interface chip acknowledgment signal (ACK_FBI-1), and transmits this to the memory controller 200a. Here, the first interface acknowledgment signal (ACK_FBI-2) includes the nonvolatile memory configuration information, the second interface chip configuration information, and first interface chip configuration information.

Upon receipt of the first interface acknowledgment signal (ACK_FBI-2), the memory controller 200a generates the reset signal (FBI_RST) and transmits this to the first interface chip FBI-1. The first interface chip passes the reset signal (FBI-RST) to the second interface chip FBI-2, and both the first and second interface chips FBI-1, FBI-2 are reset in response to the reset signal (FBI-RST).

Once the first and second interface chips FBI-1, FBI-2 are reset in response to the reset signal (FBI-RST), the memory controller 200a generates the nonvolatile memory initialization signal (NVM_INT), and transmits this to the nonvolatile memory device via the first and second interface chips FBI-1, FBI-1. And in response to the nonvolatile memory initialization signal (NVM_INT), the nonvolatile memory device reads the boot loader, and transmits this to the memory controller 200a via the first and the second interface chips FBI-1, FBI-2. The memory controller 200a may then initialize the nonvolatile memory devices of the memory package 100a using the boot loader in conjunction with the nonvolatile memory configuration information.

Referring now to FIGS. 6, 10, 11, 12 and 13, the initialization of the storage device 20 may alternately be accomplished by generating first and second reset signals (FBI_RST-1 and FBI_RST-2) in response to related interface layer depth information. Thus, the first reset signal (FBI_RST-1) may be used to reset the first interface chip FB1-1, while the second reset signal (FBI_RST-2) may be used to independently reset the second interface chip FBI-2. Other operations and/or steps shown in the operational flow of FIG. 13 may be the same as those previously described in relation to FIG. 12.

Figure 14:
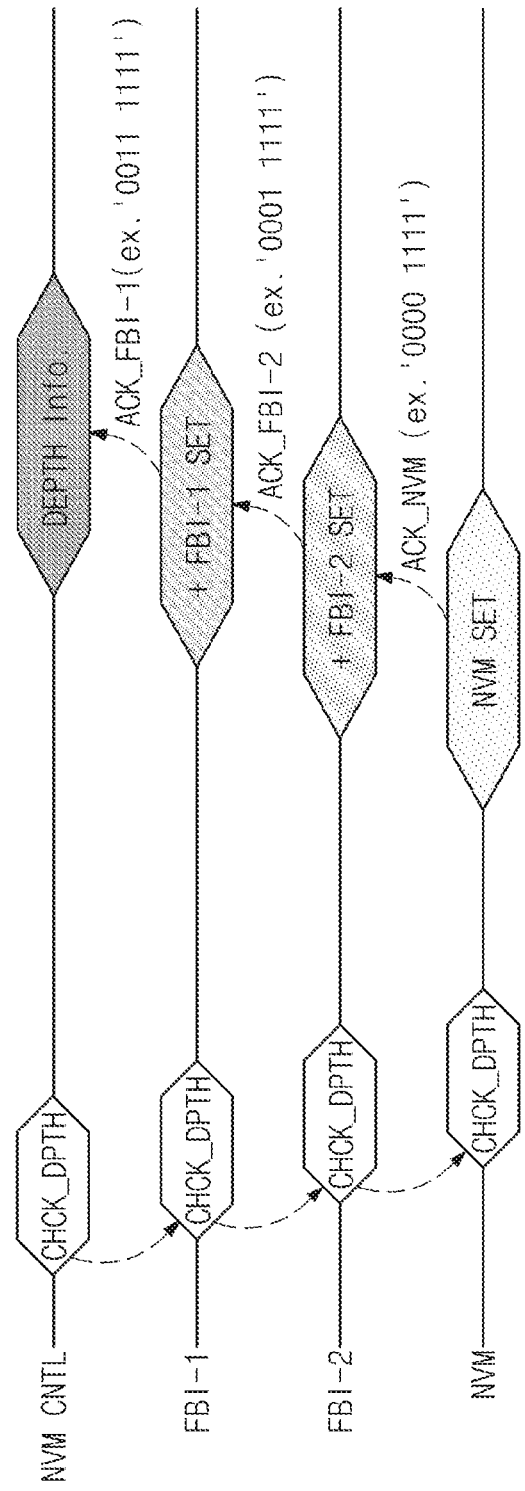
FIG. 14 is an operational flow diagram illustrating the layer depth check process of the initialization operation for a storage device according to embodiments of inventive concept.

FIG. 14 is an operational flow diagram further illustrating a layer depth check step within the execution of an initialization operation for storage devices according to embodiments of the inventive concept. For convenience of description, the layer depth check step described in relation to FIG. 14 assumes the use of storage device 20 and related components shown in FIG. 6.

Referring to FIGS. 6 and 14, the memory controller 200a may be used to generate a layer depth check command (CHCK_DPTH), and transmit this to the first interface chip FBI-1. The first interface chip FBI-1 then passes the layer depth check command to the second interface chip FBI-2, whereupon the second interface chip FBI-2 transmit the layer depth check command (CHCK_DPTH) to one or more nonvolatile memory device(s) NVM connected via one or more internal channel(s).

In response to the layer depth check command (CHCK_DPTH), the nonvolatile memory device NVM generates a nonvolatile memory acknowledgment signal (ACK_NVM) including the nonvolatile memory configuration information (NVM SET). For example, assuming that a nonvolatile memory acknowledgement signal (ACK_NVM) of "0000 1111" is generated, the "1111" may constitute a back part of the nonvolatile memory acknowledgment signal providing nonvolatile memory configuration and/or connectivity information (NVM SET) indicating that four (4) nonvolatile memory device are currently connected via a single internal channel (e.g., ICH1).

The second interface chip FBI-2 may receive the nonvolatile memory acknowledgment signal (ACK_NVM) from the nonvolatile memory device NVM, and generate a second interface chip acknowledgement signal (ACK_FBI- 2) including the second interface chip configuration information (FBI-1 SET). For example, when the second interface chip acknowledgement signal (ACK_FBI-2) of "0001 1111" is generated, the "0001" may constitute a front part of the second interface chip configuration information (FBI-2 SET) indicating that the second interface chip is exists. Here, the "1111" still constitutes the back part of the nonvolatile memory configuration information (NVM SET) as described above.

Additionally, the first interface chip FBI-1 may receive the second interface chip acknowledgment signal (ACK_FBI-2) from the second interface chip FBI-2, and generate a first interface chip acknowledgement signal (ACK_FBI-1) including the first interface chip configuration information (FBI-1 SET). For example, when the second interface chip acknowledgement signal (ACK_FBI-1) is "0011 1111", the "0011" may constitute a front part of the first interface chip configuration information (FBI-1 SET) indicating that the first interface chip FBI_1 exists as well as the second interface chip FBI-2. Once again, the "1111" may constitute a back part of the nonvolatile memory configuration information (NVM SET) as described above.

The memory controller 200a, upon receiving the first interface chip acknowledgement signal (ACK_FBI-1) from the first interface chip FBI-1, understands the constituent data (e.g., "0011 1111") provided by the first interface chip acknowledgement signal (ACK_FBI-1) as meaning a layer depth of 2, and a number of nonvolatile memory devices connected to each internal channel of 4.

Figure 15:
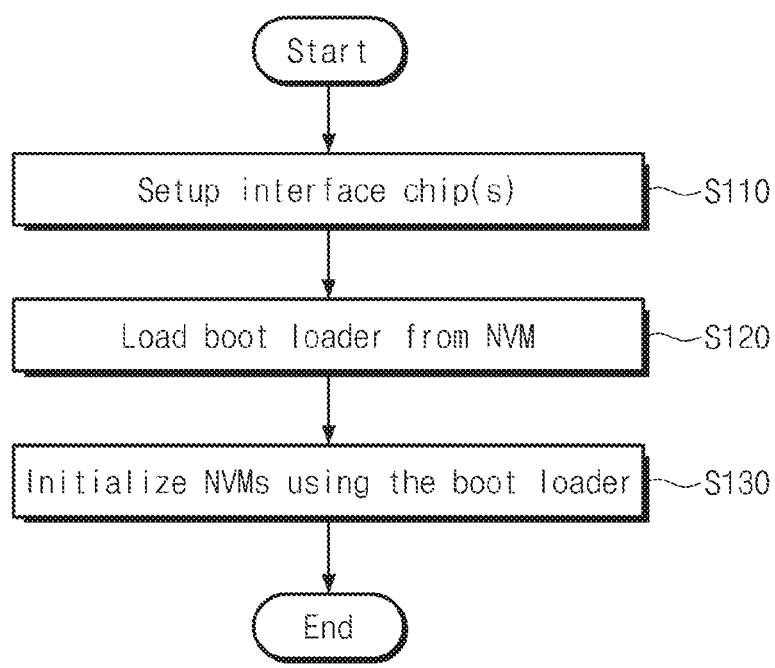
FIGS. 15, 16 and 17 are respective flowcharts variously summarizing initialization methods for storage devices according to embodiments of inventive concept.

FIG. 15 is a flowchart summarizing an initialization method that may be used by a storage device according to certain embodiments of inventive concept. Referring to the foregoing embodiments and FIG. 15, the initialization method for the storage device may begin in response to an externally provided initialization command This externally provided initialization command caused the memory controller to transition from a power-off state to a power-on state. The initialization command may be generated by user activation of a control switch, whereupon software/firmware may be invoked to retrieve stored boot code. In response to the execution of the boot code, for example, one or more interface chips will be reset by the memory controller using a reset signal (S110). This resetting of the interface chip(s) essentially forces an initialization or setup of the interface chip(s). Then, a boot loader may be retrieved from at least one nonvolatile memory device of a NVM package and loaded for execution by the memory controller (S120). Then, the memory controller may initialize the plurality of nonvolatile memory devices of the NVM package using the boot loader (S130).

Figure 16:
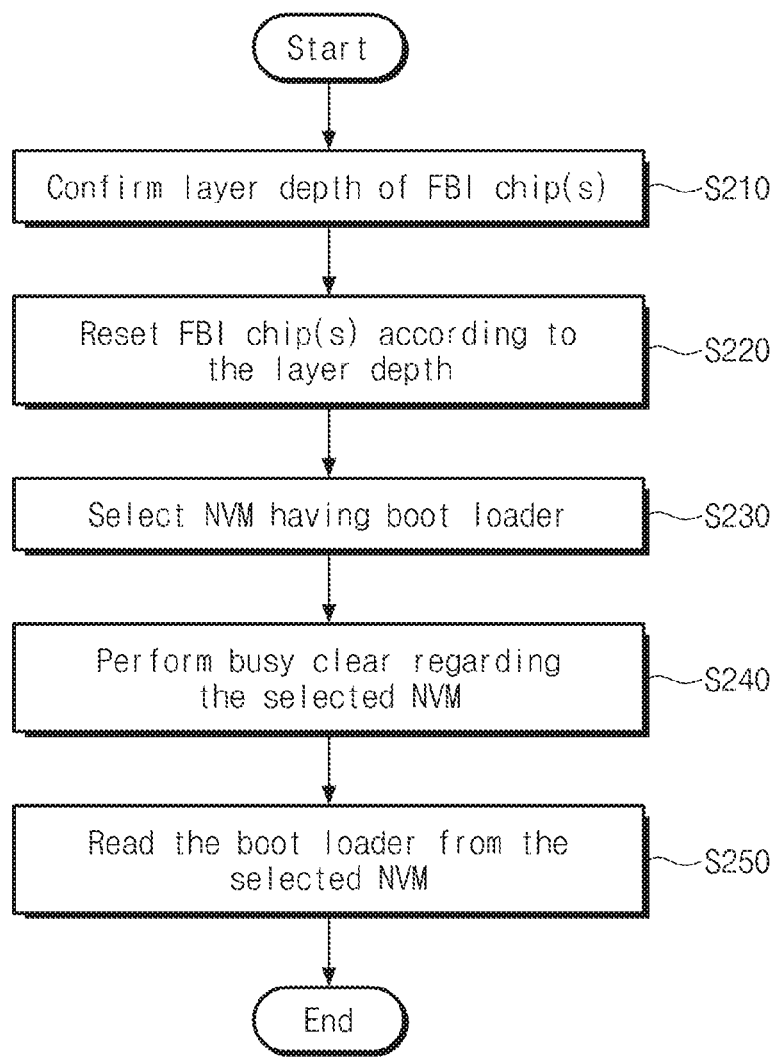

FIG. 16 is a flow chart summarizing another initialization method that may be used by a storage device according to certain embodiments of the inventive concept. Referring to FIGS. 1, 14 and 16, upon beginning the initialization operation, a layer depth for interface chips and nonvolatile memory devices may be performed (S210). Hence, one of the approaches set forth above in relation to FIGS. 12, 13 and may be used. As a result, the constituent interface chip(s) (FBI chip(s)) may be reset in accordance with their confirmed layer depth (S220). That is, each interface chip may be appropriately and independently reset according to its layer disposition.

Then, the nonvolatile memory device NVM stored the boot loader may be retrieved in response to a nonvolatile memory initialization signal (S230). A busy clear function may then be executed in relation to a selected nonvolatile memory device NVM (S240). Alternately, the busy clear function may be executed regarding to not only the selected nonvolatile memory device NVM, but also the other nonvolatile memory devices. Then, the boot loader is read from the selected nonvolatile memory device NV (S250), and the memory controller may initialize the nonvolatile memory devices using the read boot loader.

With the foregoing in mind, it is possible that an initialization method for a storage device according to embodiments of the inventive concept might be executed differently in response to a failed layer depth check process.

Figure 17:
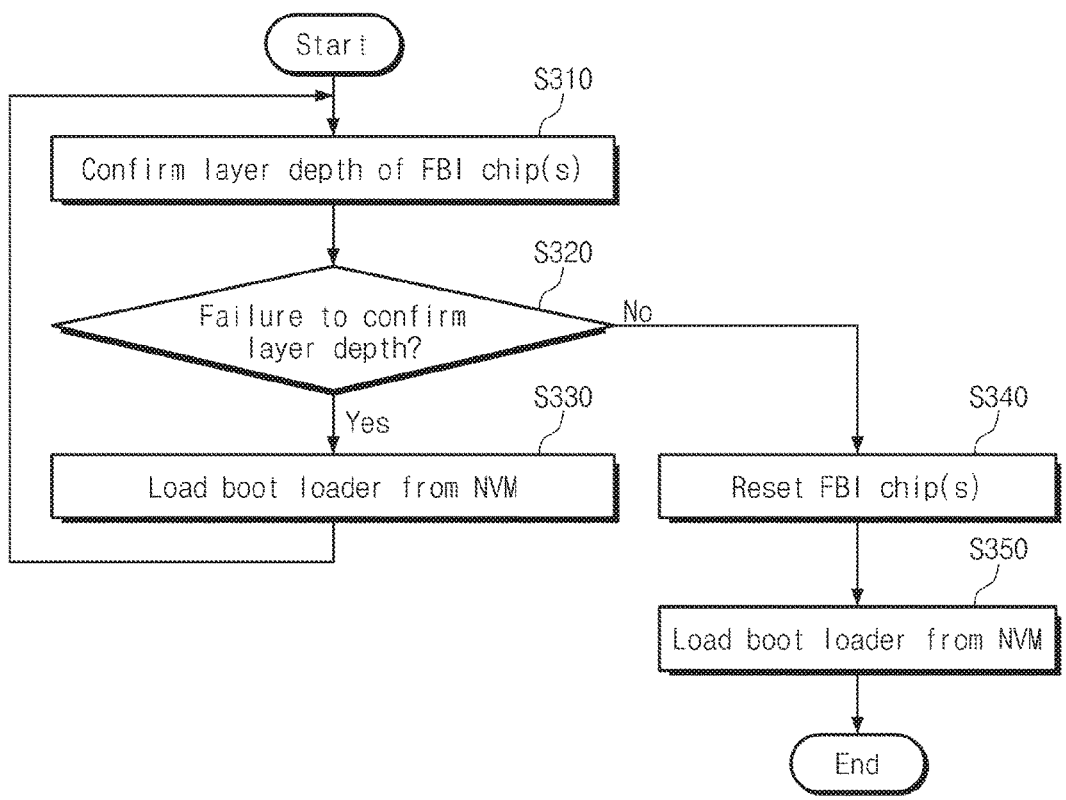

FIG. 17 is a flow chart summarizing an initialization method that may be used by a storage device according to embodiments of the inventive concept. Referring to FIGS. 1, 14 and 17, upon beginning an initialization operation, it is preferable to confirm layer depth for interface chip(s) and/or nonvolatile memory devices. Thus, a layer depth confirming process, such as the ones described in relation to FIGS. 12, 13 and 14 may be performed (S310). However, the initialization method of FIG. 17 recognizes the possibility that the layer depth confirmation process might fail. So, an expressed determination is made in this regard (S320). Where the layer depth confirmation fails (S320=Yes), the memory controller may generate the nonvolatile memory initialization signal, and transmit the nonvolatile memory initialization signal to the nonvolatile memory device via one or more interface chips. In response, the memory controller may proceed with the loading of the boot loader from the nonvolatile memory device NVM (S330). Then, the layer depth confirmation process may be repeated (S310).

However, if the layer depth confirmation process does not fail (S310=No), the interface chip(s) will be reset (S340), and then the boot loader is loaded from the nonvolatile memory device (S350). In this manner, an initialization method for a storage device consistent with certain embodiments of the inventive concept may be executed even in the face of a failed layer depth confirmation.

Figure 18:
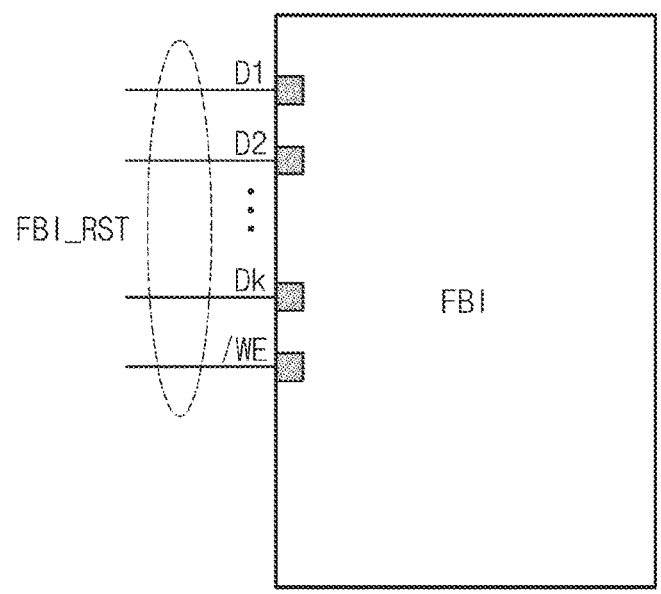
FIG. 18 is a block diagram illustrating a reset signal FBI_RST according to an embodiment of inventive concept.

FIG. 18 is a block diagram illustrating an embodiment of the inventive concept responsive to one type (or format) of reset signal (FBI_RST). Referring to FIG. 18, the interface chip FBI may receive the reset signal (FBI_RST) in the form of a defined command. The interface chip FBI may analyze the received command, and execute the reset operation based on the command In FIG. 18, the command form is exemplary embodiment that is combination of the data signal and the write enable signal. However, the command may be formed with various forms.

Figure 19:
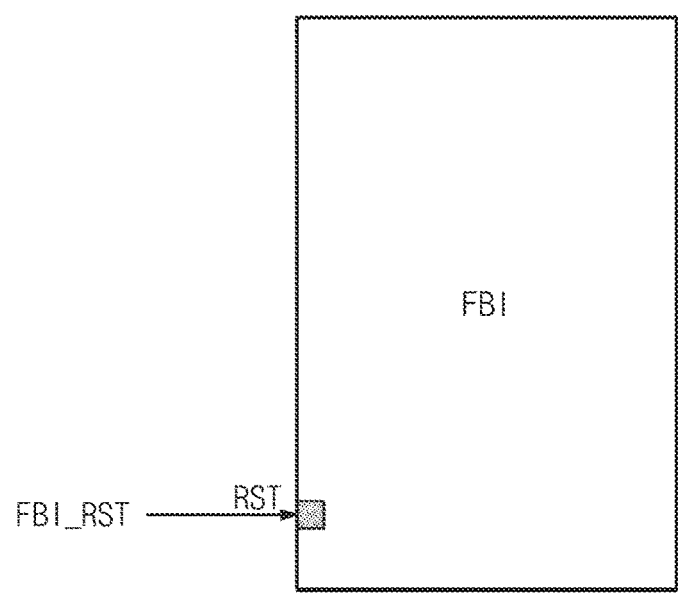
FIG. 19 is a diagram illustrating a reset signal according to an embodiment of the inventive concept.

FIG. 19 is a block diagram illustrating an embodiment of the inventive concept responsive to another type (or format) of reset signal (FBI_RST). Referring to FIG. 19, the reset signal (FBI_RST) may be communicated via a designated reset pin RST. However, in a multi layer configuration of interface chips,multiple designated reset pins might be used.

Figure 20:
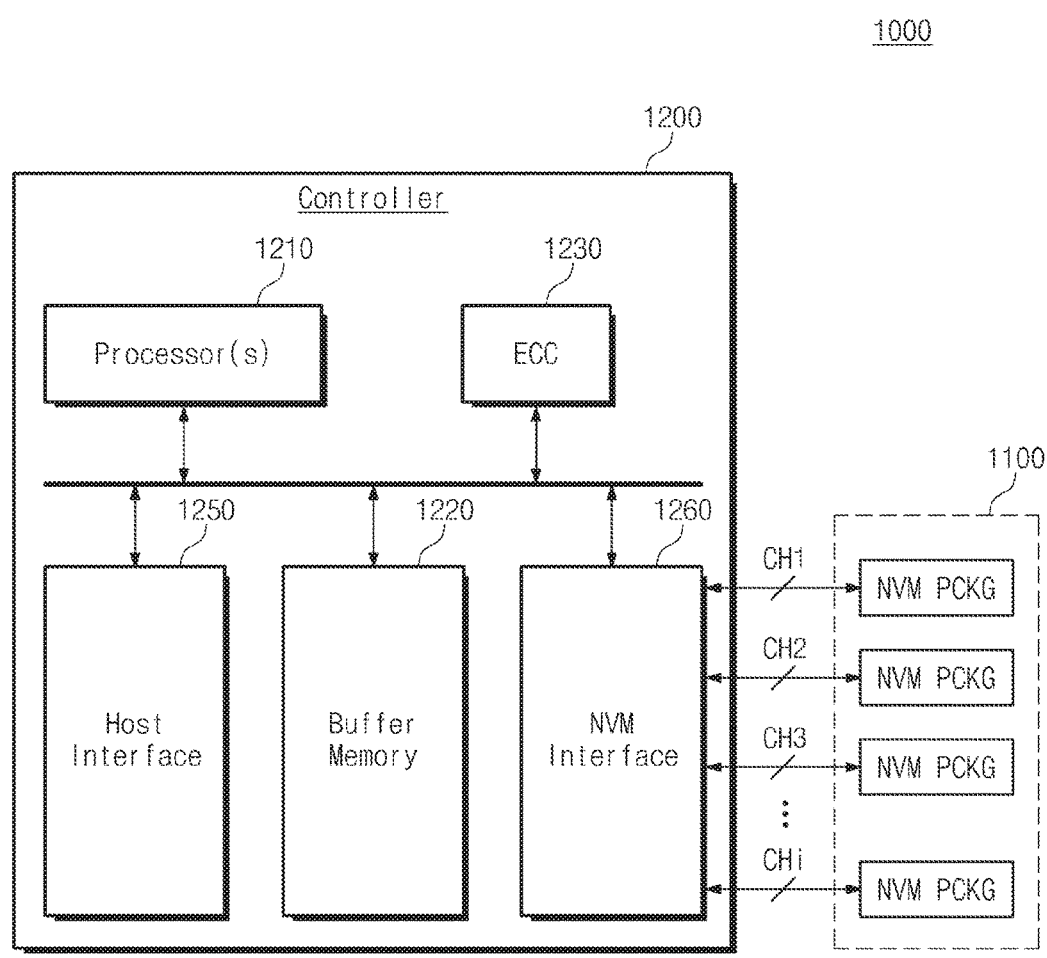
FIG. 20 is a block diagram illustrating a solid state drive (SSD) according to an embodiment of inventive concept.

FIG. 20 is a block diagram illustrating a solid state drive (SSD) 1000 that may incorporate one or more storage device(s) according to embodiments of inventive concept. Referring to the FIG. 20, the SSD 1000 includes a plurality of nonvolatile memory devices 1100 and a SSD controller 1200.

The nonvolatile memory devices 1100 may be implemented optionally supplied external high voltage VPP. The SSD may include a plurality of nonvolatile memory packages NVM PCKG connected to the plurality of channels CH1~CHi, where I is an integer greater than 1. Herein, the nonvolatile memory packages NVM PCKG may include at least one interface chip FBI described in FIG. 1 through FIG. 19.

The SSD controller 1200 may be connected to the nonvolatile memory devices 1100 via the plurality of channels (CH1~Chi). The SSD controller 1200 may reset preferentially at least one interface chip FBI in the initialization operation described in FIG. 1 through FIG. 19.

The SSD controller 1200 may include at least one processor 1210, a buffer memory 1220, an error correction circuit 1230, a host interface 1250 and a nonvolatile memory interface 1260.

The buffer memory 1220 may store temporarily data desired for operations of the memory controller 1220. The buffer memory 1220 may include a plurality of memory lines to store data or command. Herein, the plurality of memory lines may be mapping to cache lines in various manners. In FIG. 20, the buffer memory 1220 is arranged internal of the memory controller 1200, however the inventive concept is not limited with this. The buffer memory of inventive concept may be arranged to external of the memory controller 1200 as a different intellectual property (IP).

The error correction circuit 1230 may calculate an error correction code value of data to be programmed in a write operation. During a read operation, the error correction circuit 1230 may perform error correction to the read data based on the error correction code, and perform error correction to recovery data from the nonvolatile memory device 1100 in a data recovery operation.

The error correction circuit 1230 may generate error correction code ECC for correcting fail bit or error bit received from the nonvolatile memory device 1100. The error correction circuit 1230 may perform an error correction encoding of data for transmitting to the nonvolatile memory device 1230, and generate data added parity bit. The parity bit may be stored in the nonvolatile memory device 1230. Also, the error correction circuit 1230 may perform an error correction decoding regarding to data received from the nonvolatile memory device 1100. The error correction circuit 1230 may correct ne or more error(s) using the parity bit. The error correction circuit 1230 may correct error using a coded modulation such as low density parity check code LDPC, BCH code, turbo code, Read-Solomon code, convolution code, recursive systemic code RSC, trellis-coded modulation TCM, Block coded modulation BCM.

Even though not shown in FIG. 20, the SSD may further include a code memory to store a code data desired to operate the memory controller. The code memory may be implemented as the nonvolatile memory device.

The host interface 1250 may provide an interface function with an external device. The host interface 1250 may be connected to a host via NAND interface such as parallel AT attachment bus PATA, serial AT attachment bus, SCSI, USB, PCIe, SD, SAS, and UFS.

The nonvolatile memory interface 1260 may provide an interface function to the nonvolatile memory device 1100.

The memory controller 1200 may be operable in providing one or more wireless telecommunication functions (e.g., WiFi).

The SSD according to the embodiment of inventive concept may perform stably the initialization operation by loading the boot loader after reset the interface chip FBI.

The inventive concept may be applied to an embedded multimedia card eMMC of the type used to configure the commercially available moviNAND and/or iNAND.

Figure 21:
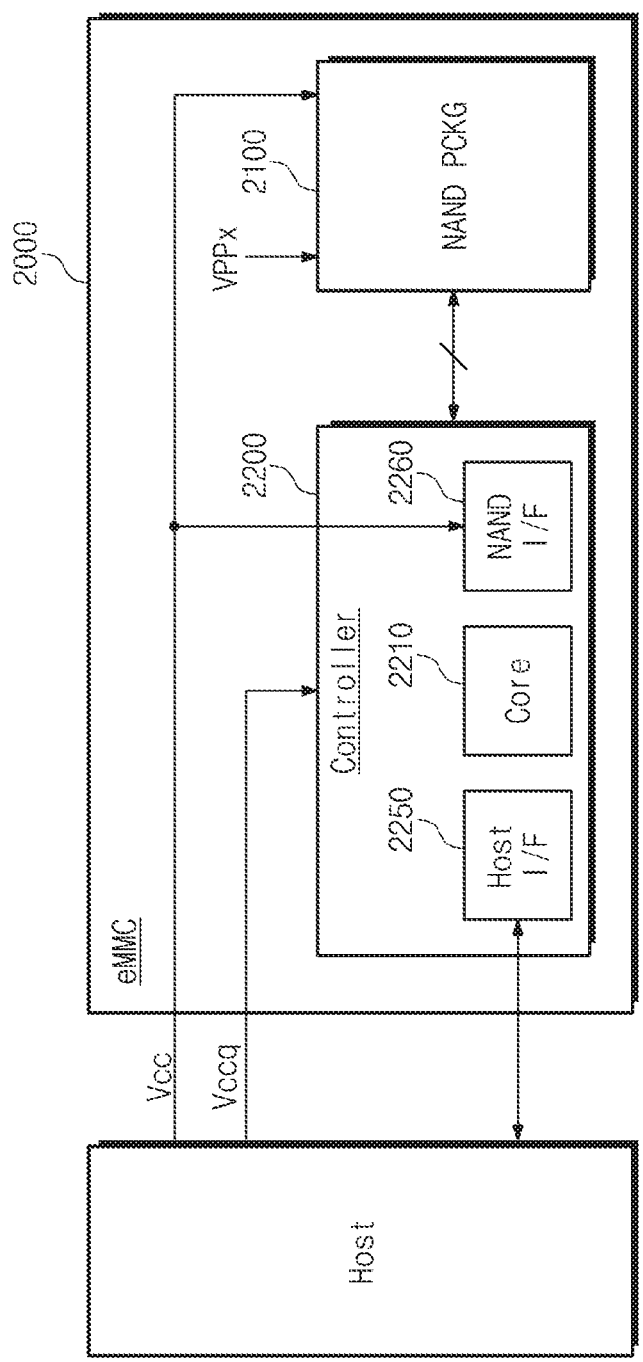
FIG. 21 is a block diagram illustrating an embedded multimedia card (eMMC) according to an embodiment of the inventive concept.

FIG. 21 is a block diagram illustrating an eMMC 2000 according to embodiments of the inventive concept. Referring to FIG. 21, the eMMC 2000 includes at least one NAND flash package NAND PCKG 2100, and a controller 2200.

The NAND flash package 2100 may be implemented as the nonvolatile memory package NVM PCKG described in FIG. 1 through FIG. 19. The memory controller 2200 may be connected to the NAND flash package 2100 via at least one channel.

The memory controller 2200 may include at least one controller core 2210, a host interface 2250, and NAND interface 2260. The at least one controller core 2210 may control overall operation of the eMMC 2000. The host interface 2250 may perform interfacing between the controller 2210 and the host. The NAND interface 2260 may perform interfacing between the NAND flash package 2100 and the memory controller 2200. In exemplary embodiments, the host interface 2250 may be parallel interface (e.g., a MMC interface). In another exemplary embodiments, the host interface 2250 of the eMMC 2000 may be serial interface (e.g., sab HS-II or UFS interface). In another embodiment, the host interface 2250 may be a NAND interface.

The eMMC 2000 may receive source voltages (Vcc, Vccq) from the host. Herein, the first source voltage (Vcc—e.g., 3.3V) is provided to the NANA flash device 2100 and NAND interface 2260. The second source voltage (Vccq—e.g., 1.8V/3.3V) is provided to the controller 2200. In embodiments of inventive concept, the eMMC 2000 may optionally receive outside high voltage (Vpp).

The eMMC 2000 according to the inventive concept may process data with high speed using the interface chip between the memory controller and NAND flash memory device.

The inventive concept may be applied to a universal flash storage (UFS) device.

Figure 22:
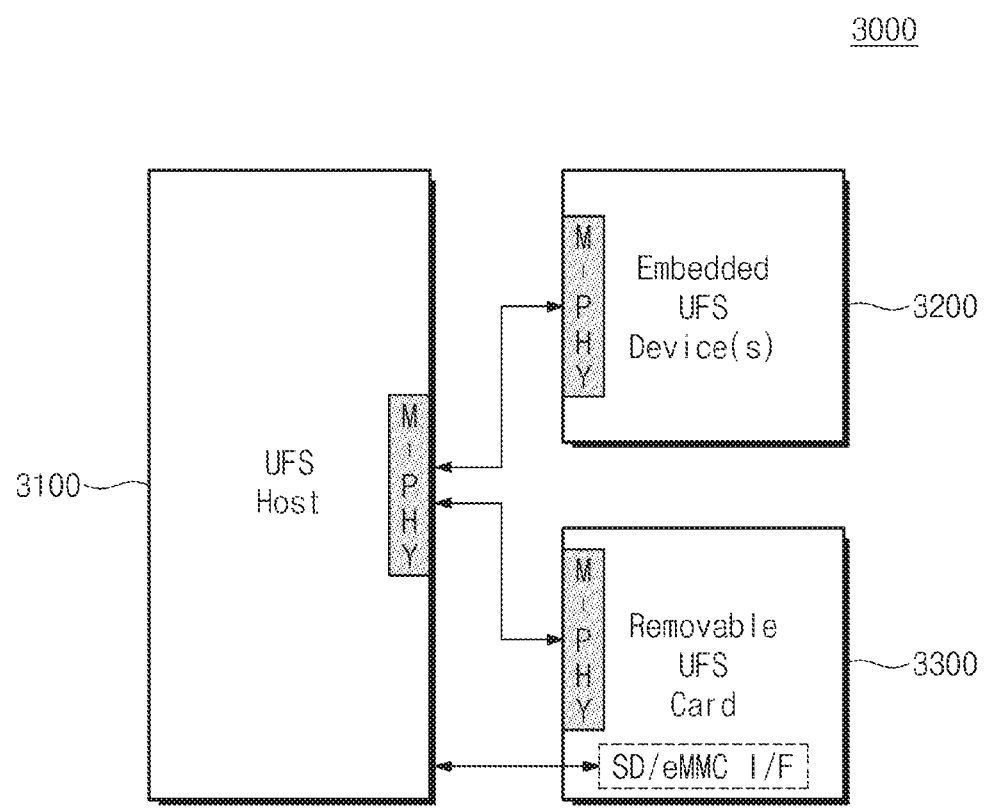
FIG. 22 is a block diagram illustrating a universal flash storage (UFS) system according to an embodiment of inventive concept.

FIG. 22 is a block diagram illustrating a UFS system according to embodiments of inventive concept. Referring to FIG. 22, the UFS system 3000 may include a UFS host 3100, at least one embedded UFS device 3200, and a detachable UFS device 3300. Communication between the UFS host 3100 and the embedded UFS device 3200 may be performed via M-PHY layer. Communication between the UFS host 3100 and the detachable UFS card 3300 may be performed via M-PHY layer.

At least one of the embedded UFS device 3200 and the detachable UFS card 3300 may be embodied at least one of the storage device 10 of FIG. 1, the storage device 20 of FIG. 6, the storage device 30 of FIG. 7, and the storage device 40 of FIG. 8.

The detachable UFS card 3400 may include a bridge to communicate via other protocol not UFS. The UFS host 3100 and the detachable UFS card 3400 may communicate via various card protocol (for example, UFDs, MMC, eMMC, SD(secure digital), mini SD, Micro SD etc).

Figure 23:
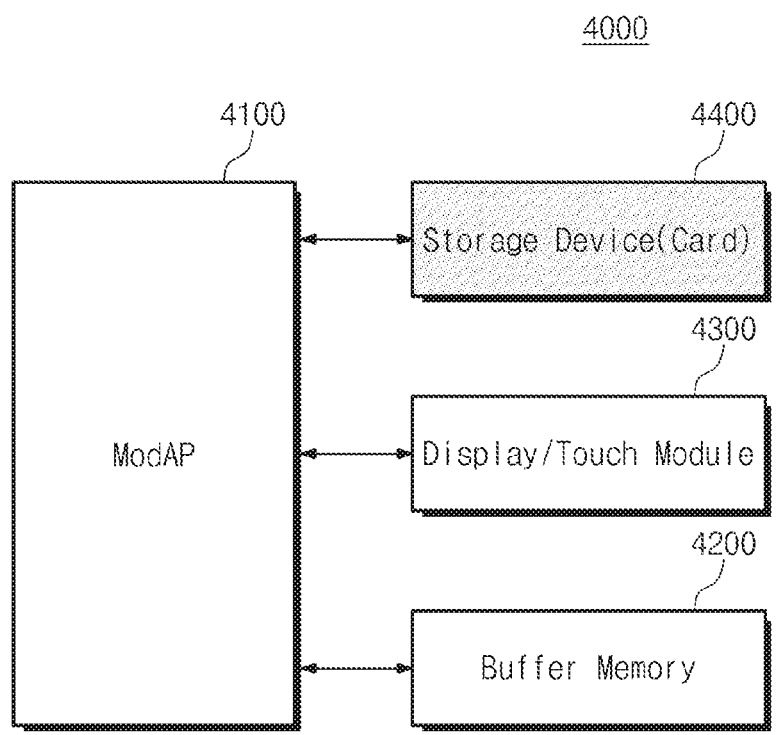
FIG. 23 is a block diagram illustrating a mobile device according to an embodiment of the inventive concept.

The inventive concept may be applied to mobile devices. FIG. 23 is a block diagram illustrating a mobile device according to embodiments of the inventive concept. Referring to FIG. 23, the mobile device 4000 may include a modem application processor (ModAP) 4100, a buffer memory 4200, a display/touch module 4300, and a storage device 4400.

ModAP 4100 may control overall operations of the mobile device 4000 and external wired/wireless communication. The buffer memory 4200 may store data required in mobile device 4000 operations. The display/touch module 4300 may display data processed at ModAP 4100. The display/touch module 4300 may receive data from the touch panel. The storage device 4400 may store user data. The store device 4400 may be a eMMC, SSD, UFS device. The storage device 4400, as described in FIG. 1 through FIG. 19, may reset preferentially the interface chip FBI in the initialization operation, and perform initialization operation of the nonvolatile memory.

The mobile device 4000 may have optimal operation performance by performing stably the initialization operation using the described initialization methods.

Figure 24:
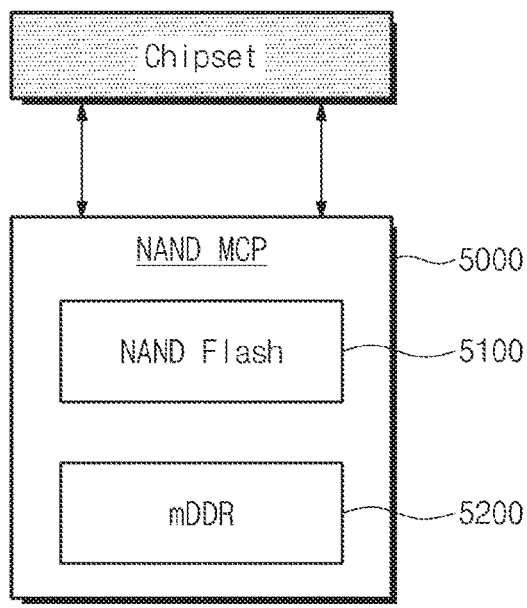
FIG. 24 is a block diagram illustrating a NAND flash multi chip package (MCP) according to an embodiments of inventive concept.

FIG. 24 is a block diagram regarding to NAND multi chip package (MCP) according to embodiments of inventive concept. Referring to FIG. 24, a NAND MCP 5000 may include a NAND flash memory 5100 and mobile double data rate (mDDR) memory device 5200. The NAND flash memory chip 5100 may be embodied the described nonvolatile memory package NVM PCKG. The mDDR memory device 5200 is mobile SDRAM (synchronous dynamic random access memory. The chipset may manage the NAND flash memory device 5100 and mDDR memory device 5200, respectively.

Figure 25:
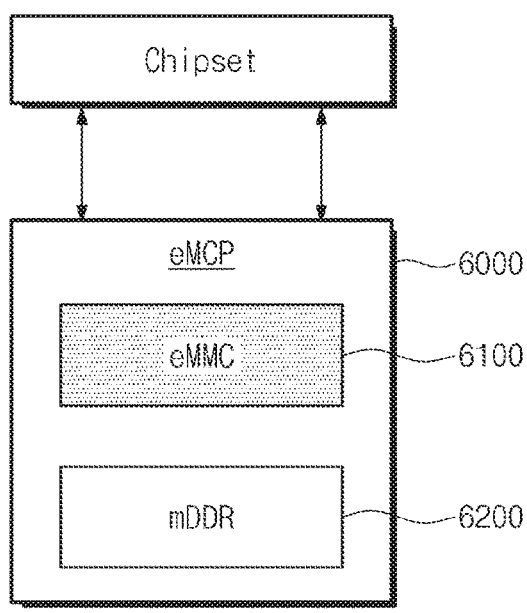
FIG. 25 is a block diagram illustrating an embedded MCP (eMCP) according to an embodiment of inventive concept.

FIG. 25 is a block diagram illustrating eMCP(embedded MCP) according to embodiments of inventive concept. Referring to FIG. 25, eMCP 6000 may include eMMC 6100 and mDDR memory device 6200 as one package. The eMMC 6100 may be embodied eMMC 2000 of FIG. 21. The mDDR memory device 6200 may be a mobile synchronous dynamic random access memory (SDRAM) or mobile flash memory device.

Figure 26:
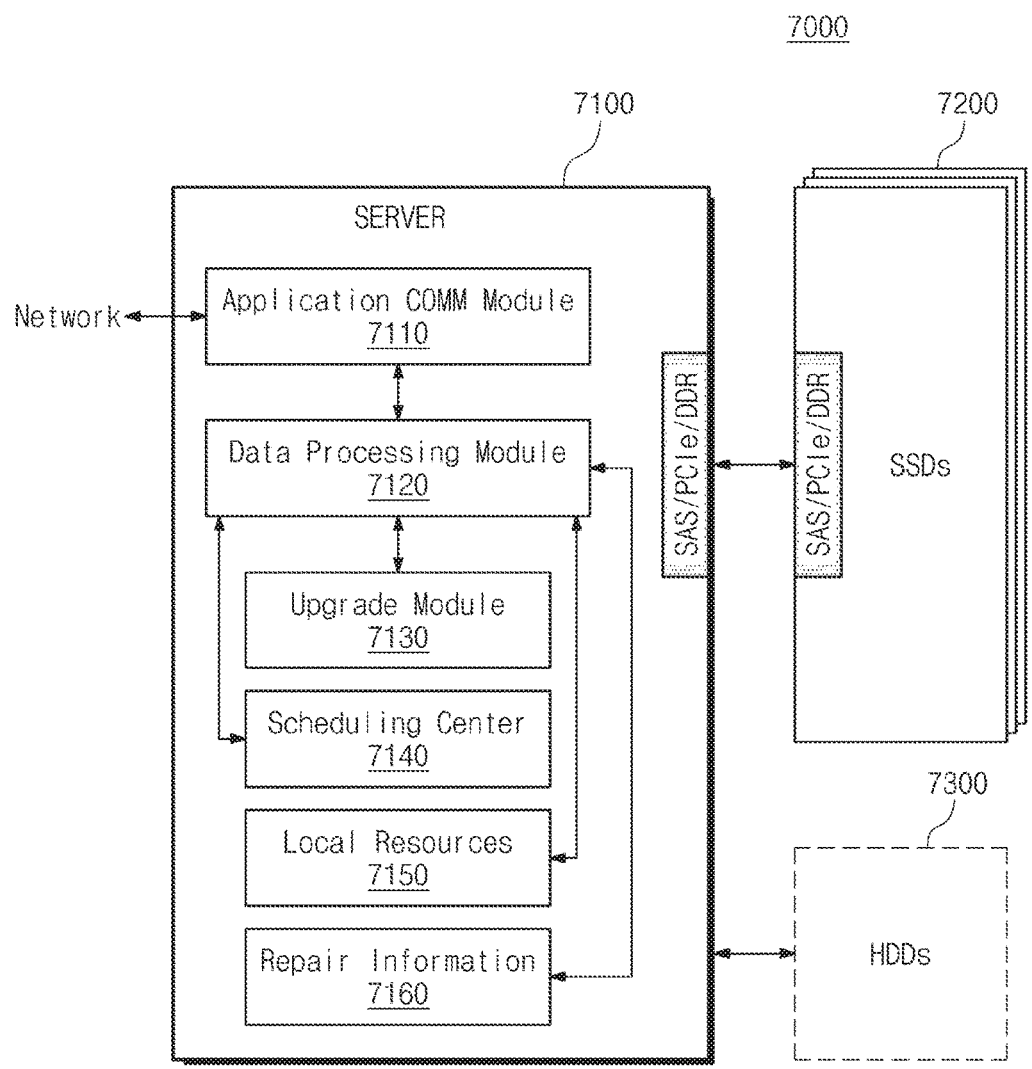
FIG. 26 is a block diagram illustrating a data server system according to an embodiment of inventive concept.

The inventive concept may be applied to data server system. Referring to FIG. 26, data server system 7000 may include a server 7100, and at least one SSD 7200 to store data desired to operate the server 7100. Herein, SSD 7200 may be embodied identically as the storage device 1000 of FIG. 20. The SSD 7200 may be connected to the server 7100 via various interfaces such as SAS, PCIe, DDR(dual data rate).

The server 7100 may include a application communication module 7110, a data processing module 7120, an upgrade module 7130, a scheduling center 7140, a local resource module 7150, and a repair information module 7160. The application communication module 7110 may communicate with a computer system connected to a network and the server 7100. The application communication module 7110 may be embodied to communicate with the server 7100 and the SSD7200. The application communication module 7110 may transmit data or information received via an user interface to the data processing module 7120. The data processing module 7120 may link to the local resource module 7150. Herein, the local resource module 7150, based on the received data or information to the server, may transmit a list of repair shops/dealers/technical information to the user.

The upgrade module 7130 may be interfacing with the data processing module 7120. The upgrade module 7130, based on data or information received from the SSD 7200, may upgrade firmware, reset code, diagnostic system upgrade, and/or other information to a appliance. The scheduling center 7140 may permit real-time option to the user based on the received data or information to the sever 7100.

The repair information module 7160 may be interfacing with the data processing module 7120. The repair information module 7160 may be used to transmit repair related information (e.g., audio, video, or document file) to user. The data processing module 7120 may be packaging related information based on the information received from the SSDs 7200. Hereafter, this information may be transmit to the SSD 7200 or displayed to the user.

In certain embodiments, hard disk drives (HDDs) 7300 may be connected to the server 7100 optionally.

The memory system or storage device according to embodiments of the inventive concept may be mounted using various package form. In embodiments of the inventive concept, the memory system or storage device may be mounted using PoP (Package on Package), Ball grid arrays (BGAs), Chip scale packages (CSPs), Plastic Leaded Chip Carrier (PLCC), Plastic Dual In-Line Package(PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), etc.

Figure 27A:
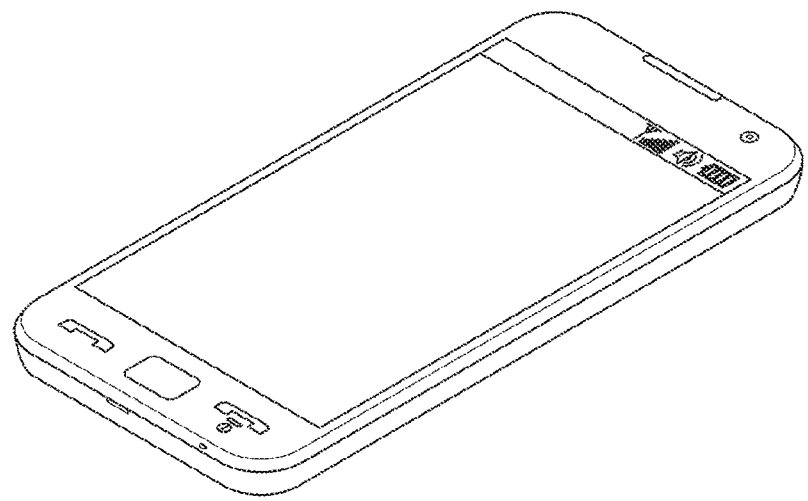
FIG. 27a, FIG. 27b, and FIG. 27c are respective diagrams illustrating a smart phone, a wearable watch, and smart glasses that may incorporate a storage device according certain embodiments of inventive concept.
Figure 27B:
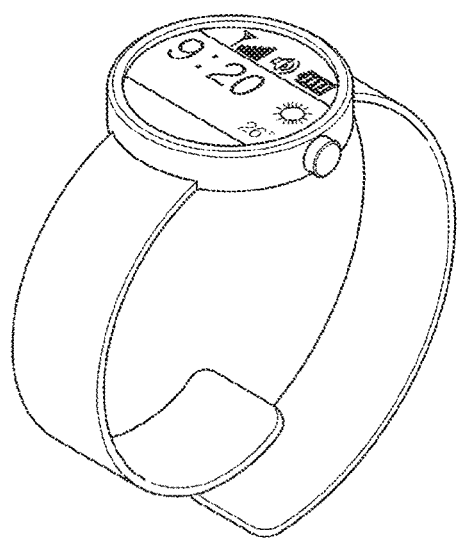
Figure 27C:
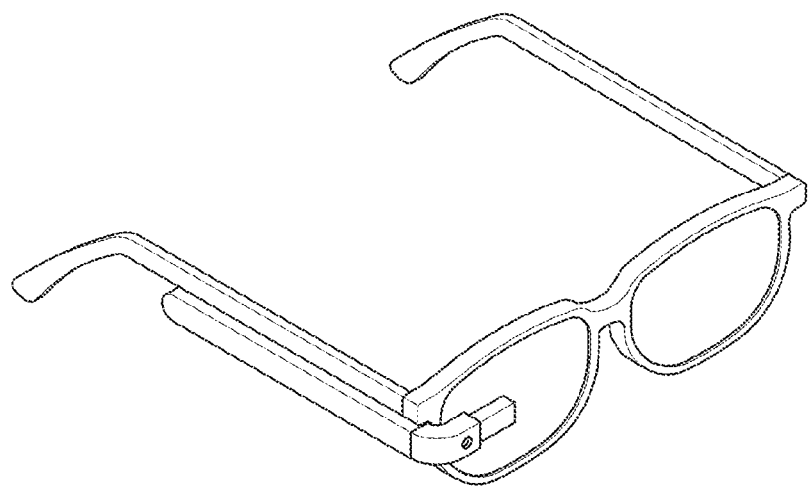

One or more storage device(s) according to embodiments of the inventive concept, may be applied to various electronic devices such as a smart phone, a wearable watch and smart glasses like those illustrated in FIGS. 27A, 27B and 27C.

The wearable watch may carry out wireless communication. The wearable watch may include a watch to input data (image, photo, text etc) or display data, and a watch band to wear on wrist of the user.

The shape of display of watch may be embodied circle type, or round type. The watch may include a battery (not shown) to charge source voltage in manner of wired charging or wireless charging. Herein, the wireless charging may be at least one of magnetic induction, magnetic resonance, electromagnetic induction, witricity etc. The battery may be embodied to built in not the watch but watch band.

The watch may include various sensors such as camera sensor, audio sensor, proximity sensor, illumination sensor, GPS(global position system) sensor, acceleration sensor, magnetic field sensor, gyroscope etc. specially, the watch of inventive concept may include a position sensor for sensing a motion of wearable watch or user motion. For example, the position sensor may include at least one of GPS sensor, illumination sensor, proximity sensor, magnetic sensor, acceleration sensor, and gyroscope sensor, to output motion data.

The above-disclosed subject matter is to be considered illustrative in nature, and the scope of the following claims extends over many modifications and enhancements that will become apparent to those of ordinary skill in the art upon consideration of the foregoing. Thus, to the maximum extent allowed by law, the scope of the claims shall be determined by the broadest permissible interpretation, and shall not be restricted or limited to only the foregoing illustrated embodiments.

What is claimed is:

1. A method of initializing a storage device in a memory system including a memory controller and the storage device, wherein the storage device includes an interface chip and a plurality of nonvolatile memory devices connected to the interface chip, the method comprising:
    confirming an interface layer depth of the interface chip and at least one nonvolatile memory device among the plurality of nonvolatile memory devices;
    resetting the interface chip which connects the plurality of nonvolatile memory devices to the memory controller in response to a reset signal generated by the memory controller; and then,
    loading a boot loader from at least one of the plurality of nonvolatile memory devices to the memory controller via the interface chip in response to a nonvolatile memory initialization signal generated by the memory controller; and initializing the plurality of nonvolatile memory devices by executing the boot loader in the memory controller.

2. The method of claim 1, wherein the reset signal is generated in response to one of an externally-provided initialization command received by the memory controller, an initialization command internally generated by the memory controller, a transition by the storage device from a power-off state to a power-on state, receipt by the memory controller of a power-on signal, and operation of a switch by a user.

3. The method of claim 1, wherein the reset signal is one of a command configured from at least one control signal, or at least one control signal applied to at least one reset pin of the interface chip.

4. The method of claim 1, wherein the reset signal comprises at least one reset signal determined in response to the confirming of the interface layer depth of the interface chip and the at least one nonvolatile memory device.

5. The method of claim 1, wherein the confirming of the interface layer depth of the interface chip and the at least one nonvolatile memory device comprises:

generating an interface layer depth check command in the memory controller;

transmitting the interface layer depth check command from the memory controller to the interface chip; and then, transmitting the interface layer depth check command from the interface chip to the at least one nonvolatile memory device.

6. The method of claim 5, wherein the confirming of the interface layer depth of the interface chip and the at least one nonvolatile memory device further comprises:

generating a nonvolatile memory acknowledgement signal including configuration information related to the at least one nonvolatile memory device in response to the interface layer depth check command; and communicating the nonvolatile memory acknowledgement signal from the at least one nonvolatile memory device to the interface chip.

7. The method of claim 6, wherein the confirming of the interface layer depth of the interface chip and the at least one nonvolatile memory device further comprises:

generating an interface chip acknowledgement signal in the interface chip including configuration information related to the interface chip and configuration information related to the at least one nonvolatile memory device in response to the nonvolatile memory acknowledgement signal; and communicating the interface chip acknowledgement signal from the interface chip to the memory controller.

8. The method of claim 7, wherein the reset signal is generated by the memory controller in response to the interface chip acknowledgement signal.

9. The method of claim 1, further comprising:

determining whether the confirming of the interface layer depth of the interface chip and the at least one nonvolatile memory device failed; and upon determining that the confirming of the interface layer depth of the interface chip and of the at least one nonvolatile memory device failed, loading the boot loader from the at least one of the plurality of nonvolatile memory devices to the memory controller via the interface chip, else resetting the interface chip in response to the reset signal generated by the memory controller and communicated to the interface chip, and then loading the boot loader from the at least one of the plurality of nonvolatile memory devices to the memory controller via the interface chip.

10. The method of claim 9, further comprising:

upon determining that the confirming of the interface layer depth of the interface chip and the at least one nonvolatile memory device failed, reconfirming the interface layer depth of the first interface chip and of the at least one nonvolatile memory device.

11. A method of initializing a multi-layer storage device in a memory system including a memory controller and the storage device, wherein the storage device includes a first interface chip disposed at a first layer, a second interface chip disposed at a second layer and a plurality of nonvolatile memory devices connected to the second interface chip, the method comprising:

resetting the first interface chip disposed at the first layer and the second interface chip disposed at the second layer in response to a reset signal generated by the memory controller; and then, loading a boot loader via the first and second interface chips to the memory controller from a nonvolatile memory device among the plurality of nonvolatile memory devices which are connected to the second interface chip, in response to a nonvolatile memory initialization signal generated by the memory controller; and initializing the plurality of nonvolatile memory devices by executing the boot loader in the memory controller.

12. The method of claim 11, wherein the reset signal is generated in response to one of an externally-provided initialization command received by the memory controller, an initialization command internally generated by the memory controller, a transition by the storage device from a power-off state to a power-on state, receipt by the memory controller of a power-on signal, and operation of a switch by a user.

13. The method of claim 11, wherein the reset signal is one of a command configured from at least one control signal, or at least one control signal applied to at least one reset pin of the interface chip.

14. The method of claim 11, further comprising:

confirming an interface layer depth of the first interface chip, the second interface chip and the nonvolatile memory device.

15. The method of claim 14, wherein the reset signal comprises at least one reset signal determined in response to the confirming of the interface layer depth of the first interface chip, the second interface chip and the nonvolatile memory device.

16. The method of claim 15, wherein the reset signal comprises a first reset signal applied to the first interface chip and a second reset signal independently applied to the second interface chip with respect to the first reset signal.

17. The method of claim 14, wherein the confirming of the interface layer depth of the first interface chip, the second interface chip and the nonvolatile memory device comprises:

generating an interface layer depth check command in the memory controller;

transmitting the interface layer depth check command from the memory controller to the first interface chip;

transmitting the interface layer depth check command from the first interface chip to the second interface chip; and transmitting the interface layer depth check command from the second interface chip to the nonvolatile memory device.

18. The method of claim 17, wherein the confirming of the interface layer depth of the first interface chip, the second interface chip and the nonvolatile memory device further comprises:

generating a nonvolatile memory acknowledgement signal including configuration information related to the nonvolatile memory device in response to the interface layer depth check command;

communicating the nonvolatile memory acknowledgement signal from the nonvolatile memory device to the second interface chip;

generating a second interface chip acknowledgement signal in the second interface chip including configuration information related to the second interface chip and configuration information related to the nonvolatile memory device in response to the nonvolatile memory acknowledgement signal; and communicating the second interface chip acknowledgement signal from the second interface chip to the first interface chip.

19. The method of claim 18, wherein the confirming of the interface layer depth of the first interface chip, the second interface chip and the nonvolatile memory device further comprises:

generating a first interface chip acknowledgement signal in the first interface chip including configuration information related to the first interface chip, configuration information related to the second interface chip, and configuration information related to the nonvolatile memory device in response to the second interface chip acknowledgement signal;

communicating the first interface chip acknowledgement signal from the first interface chip to the memory controller; and generating the reset signal in the memory controller in response to the first interface chip acknowledgement signal.

* * * * *